United States Patent
Ahn et al.

(10) Patent No.: US 9,354,850 B2
(45) Date of Patent: May 31, 2016

(54) METHOD AND APPARATUS FOR INSTRUCTION SCHEDULING USING SOFTWARE PIPELINING

(71) Applicant: SAMSUNG ELECTRONICS CO., LTD., Suwon-si, Gyeonggi-do (KR)

(72) Inventors: Min-wook Ahn, Seoul (KR); Won-sub Kim, Anyang-si (KR); Tai-song Jin, Seoul (KR); Seung-won Lee, Hwaseong-si (KR); Jin-seok Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 6 days.

(21) Appl. No.: 14/507,272

(22) Filed: Oct. 6, 2014

(65) Prior Publication Data
US 2015/0100950 A1    Apr. 9, 2015

(30) Foreign Application Priority Data
Oct. 7, 2013    (KR) ......................... 10-2013-0119449

(51) Int. Cl.
*G06F 9/45* (2006.01)
(52) U.S. Cl.
CPC ................ *G06F 8/443* (2013.01); *G06F 8/433* (2013.01); *G06F 8/4452* (2013.01)
(58) Field of Classification Search
CPC ........ G06F 8/433; G06F 8/443; G06F 8/4452
USPC ................... 717/151–161; 712/241
See application file for complete search history.

(56) References Cited

U.S. PATENT DOCUMENTS

| | | | | |
|---|---|---|---|---|
| 6,490,673 B1* | 12/2002 | Heishi | ............... | G06F 9/30036 712/213 |
| 6,651,247 B1* | 11/2003 | Srinivasan | ............ | G06F 8/4452 712/226 |
| 6,671,878 B1* | 12/2003 | Bliss | ..................... | G06F 8/4452 712/215 |
| 2003/0079114 A1* | 4/2003 | Heishi | ................. | G06F 9/30036 712/213 |
| 2003/0233643 A1* | 12/2003 | Thompson | ............ | G06F 8/4452 717/161 |
| 2004/0068708 A1* | 4/2004 | Sivaraman | ......... | G06F 17/5045 716/108 |
| 2004/0215940 A1* | 10/2004 | Heishi | ................. | G06F 9/30036 712/221 |
| 2008/0104373 A1* | 5/2008 | Martin | ................. | G06F 9/3838 712/216 |
| 2009/0013316 A1* | 1/2009 | Martin | ................. | G06F 8/4452 717/161 |

OTHER PUBLICATIONS

H. Park et. al., Edge-centric Modulo Scheduling for Coarse-Grained Reconfigurable Architecture, PACT08, 2008.
Bingfeng Mei et. al., A Tightly Coupled VLIW/Reconfigurable Matrix and its Modulo Scheduling Technique, New Algorithms, Architectures and Applications for Reconfigurable Computing, 2005.
Wonsub Kim et. al., SCC based modulo scheduling for coarse grained reconfigurable processors, FPT12, 2012.

* cited by examiner

*Primary Examiner* — Qing Chen
(74) *Attorney, Agent, or Firm* — Staas & Halsey LLP

(57) ABSTRACT

A method for scheduling loop processing of a reconfigurable processor includes generating a dependence graph of instructions for the loop processing; mapping a first register file of the reconfigurable processor on an arrow indicating inter-iteration dependence on the dependence graph; and searching for schedules of the instructions based on the mapping result.

11 Claims, 20 Drawing Sheets

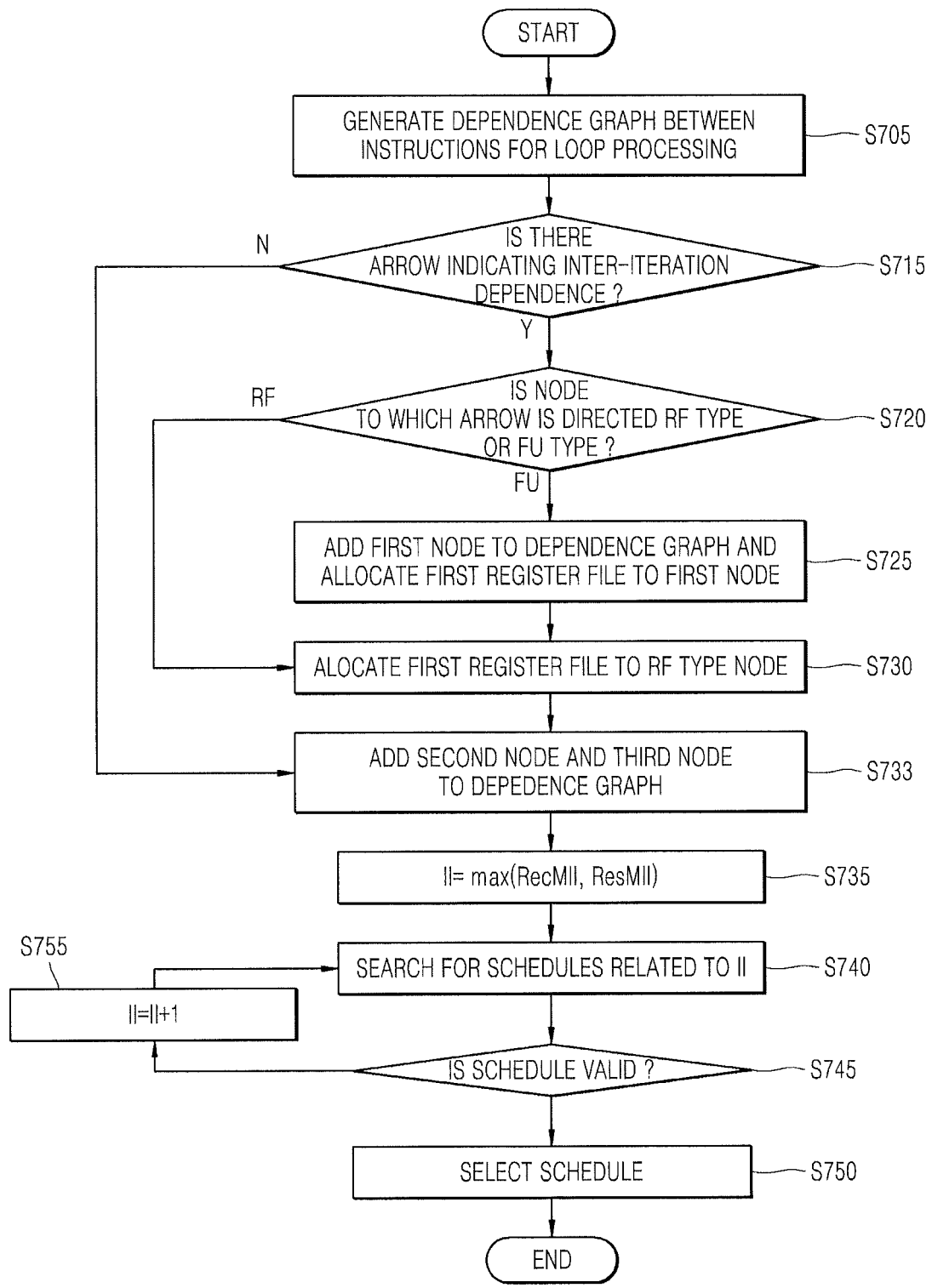

METHOD AND APPARATUS FOR INSTRUCTION SCHEDULING USING SOFTWARE PIPELINING

CROSS-REFERENCE TO RELATED APPLICATIONS

This application claims the benefit of Korean Patent Application No. 10-2013-0119449, filed on Oct. 7, 2013, in the Korean Intellectual Property Office, the disclosure of which is incorporated herein in its entirety by reference.

BACKGROUND

1. Field

One or more embodiments relate to a reconfigurable processor that operates according to a modulo scheduling method, a modulo scheduling apparatus, and modulo scheduling from among software pipelining methods, and a method of operating the reconfigurable processor.

2. Description of the Related Art

A loop that is repeatedly performed consumes an enormous number of operations in processing data by a processor, and occupies a large percentage of a total time for processing data. Therefore, diverse software pipelining methods have been suggested to reduce a burden while processing the loop.

Of the software pipelining methods, a modulo scheduling method converts a loop and processes the converted loop so as to reduce the amount of time for processing the loop and to implement a variety of iterations in parallel. According to the modulo scheduling method, the $n+1^{th}$ iteration starts while the $n^{th}$ iteration is implemented, not after the $n^{th}$ iteration is completed. As pipelining of the $n^{th}$ iteration and the $n+1^{th}$ iteration of the loop is implemented, they may be processed in parallel.

SUMMARY

The foregoing described problems may be overcome and/or other aspects may be achieved by one or more embodiments of a method of scheduling operations of a reconfigurable processor, and an apparatus therefore in order for the reconfigurable processor to stop implementing a loop to store a context of the reconfigurable processor while implementing the loop.

One or more embodiments relate to a reconfigurable processor that stops implementing a loop in order to store a context while implementing the loop, and a method of implementing the loop of the reconfigurable processor.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

According to one or more embodiments, a method for scheduling loop processing of a reconfigurable processor may include generating a dependence graph of instructions for the loop processing; mapping a first register file of the reconfigurable processor on an arrow indicating inter-iteration dependence on the dependence graph; and searching for schedules of the instructions based on the mapping result.

According one or more embodiments, a method of loop processing of a reconfigurable processor may include implementing each iteration of the loop at an integer-multiple cycle of an initiation interval; and storing data having inter-iteration dependence from among data output by function units of the reconfigurable processor in a central register file connected to a load/store unit of the reconfigurable processor as the iterations of the loop are implemented.

According to one or more embodiments a computer-readable recording medium may have recorded thereon a computer program for executing the above methods.

According to one or more embodiments a scheduling apparatus may include a memory for storing instructions for loop processing; and a modulo scheduler for generating a dependence graph of the instructions, and scheduling operations of a reconfigurable processor that may process the loop. The modulo scheduler may map a first register file of the reconfigurable processor on an arrow indicating inter-iteration dependence on the dependence graph.

According to one or more embodiments a reconfigurable processor that may include a reconfigurable coarse grained array may include first function units and second function units that may implement at least two iterations in a loop by setting a cycle gap of about an initiation interval; a plurality of pipeline registers that may be connected to the first function units, and that may store input and output data of the first function units; and a central register file that may be connected to the second function units and that may store input and output data of the second function units. The central register file may store data having an inter-iteration dependence from among data forwarded from any one of the first function units, the second function units, and the pipeline registers to another.

BRIEF DESCRIPTION OF THE DRAWINGS

These and/or other aspects will become apparent and more readily appreciated from the following description of embodiments, taken in conjunction with the accompanying drawings in which:

FIG. 7 is a flowchart of a method of modulo scheduling, according to one or more embodiments;

DETAILED DESCRIPTION

Figure 1A:
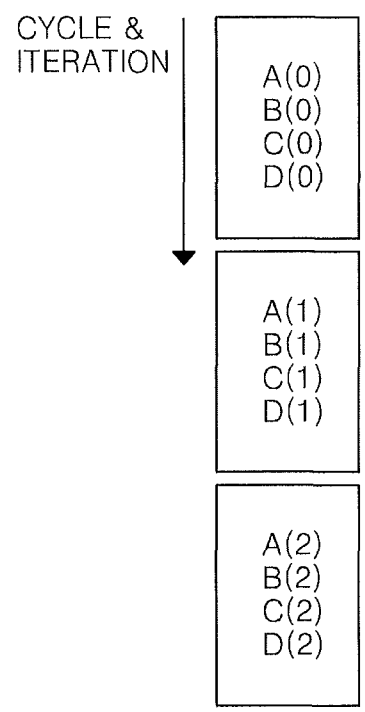
FIGS. 1A and 1B are diagrams illustrating a concept of a general modulo scheduling.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention. Expressions such as "at least one of," when preceding a list of elements, modify the entire list of elements and do not modify the individual elements of the list.

Figure 1B:
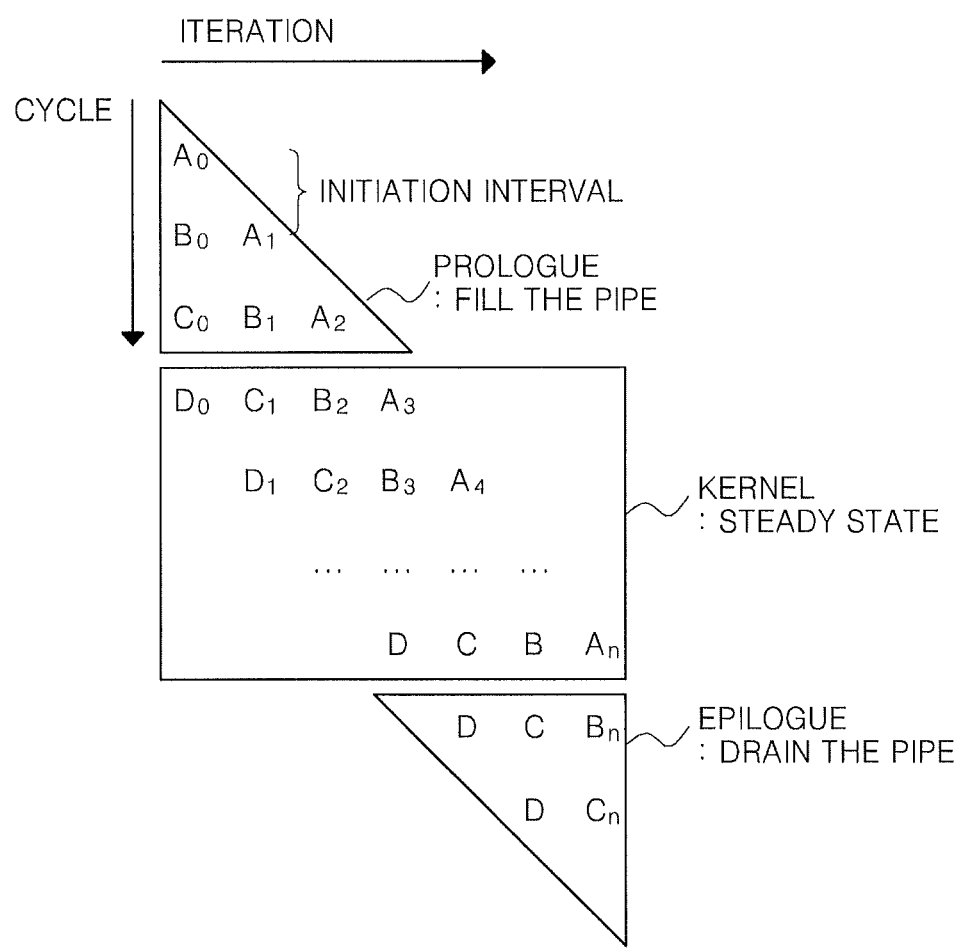

FIGS. 1A and 1B are diagrams illustrating modulo scheduling generally. FIG. 1A illustrates a process of processing a general loop in which modulo scheduling is not implemented, and FIG. 1B illustrates a process of processing a loop after the modulo scheduling is implemented as in FIG. 1A. In FIGS. 1A and 1B, it is assumed that the loop to be processed has the same code as in Table 1.

TABLE 1

| for i = 0 to n−1 |
| --- |
| A(i) ; |
| B(i) ; |
| C(i) ; |
| D(i) ; |
| end |

According to FIG. 1A, iterations i=0 to i=n−1 may be sequentially implemented according to time. That is, after the iteration i=0 is completed, the iteration i=1 may be able to be implemented. The time consumed to process the loop of Table 1 may be defined as Equation 1.

$$n*SL \qquad \text{[Equation 1]}$$

In Equation 1, SL denotes a length of a schedule that is required to implement an iteration. Accordingly, according to a method in FIG. 1A, the time consumed to process the loop is in proportion to both n and SL.

According to FIG. 1B, iterations i=0 to i=n−1 may be implemented in parallel at certain intervals. That is, the iteration i=0 starts, and then the iteration i=1 may start after a certain interval. A difference of neighboring iterations in a starting time is referred to as an initiation interval, and the initiation interval is abbreviated as II.

According to FIG. 1B, since the iterations overlap in a horizontal direction, the loop may be processed more efficiently than in FIG. 1A.

A triangle section in which the modulo scheduling starts denotes a prologue, a section to which the pipelines may be filled as much as possible is a kernel, and an inverted triangle section in which the modulo scheduling ends is an epilogue. Areas of the prologue and the epilogue should be small, and the kernel needs to be larger than the prologue and the epilogue in order to obtain a higher efficiency in FIG. 1B than in FIG. 1A during the loop processing. That is, the initiation interval II should be kept small in order to improve the efficiency in FIG. 1B, which is the same as Equation 2.

$$(n-1)*II+SL \qquad \text{[Equation 2]}$$

When n is large, SL may be ignored in an implementation cycle of the whole loop. Therefore, n may be the most crucial factor in the efficiency of the loop processing in which the initiation interval II is modulo scheduled. As a result, the efficiency of the loop processing directly relates to minimization of the initiation interval II.

The minimization of the initiation interval II is different from finding a theoretically minimum initiation interval MII. According to the theoretically minimum initiation interval MII, scheduling the instructions may be impossible. On the other hand, the minimized initiation interval II means an initiation interval II corresponding to the fastest schedule among schedules that may actually be implemented.

A reason why the scheduling may be impossible according to the theoretically minimum initiation interval MII is not that constraints resulting from limited hardware resources and dependence of the instructions are simultaneously considered, but that a schedule of processing instructions irrelevant to the loop or conditions of the interrupt is considered.

Therefore, when a schedule is actually implemented, candidate values of the initiation interval II may be respectively substituted in order to verify whether it is possible to implement the schedule. For example, when the initiation interval II value is 1, a schedule may be searched according to that value, and then validity of the schedule may be determined. In a case where the examined schedule is not valid, the initiation interval II may be increased to 2, for example. Then, according to the initiation interval II value of 2, the schedule may be examined, and the validity of the schedule may be checked again. Likewise, the above-mentioned process may be repeated by gradually increasing a value of the initiation interval II until a valid schedule is examined.

Figure 2:
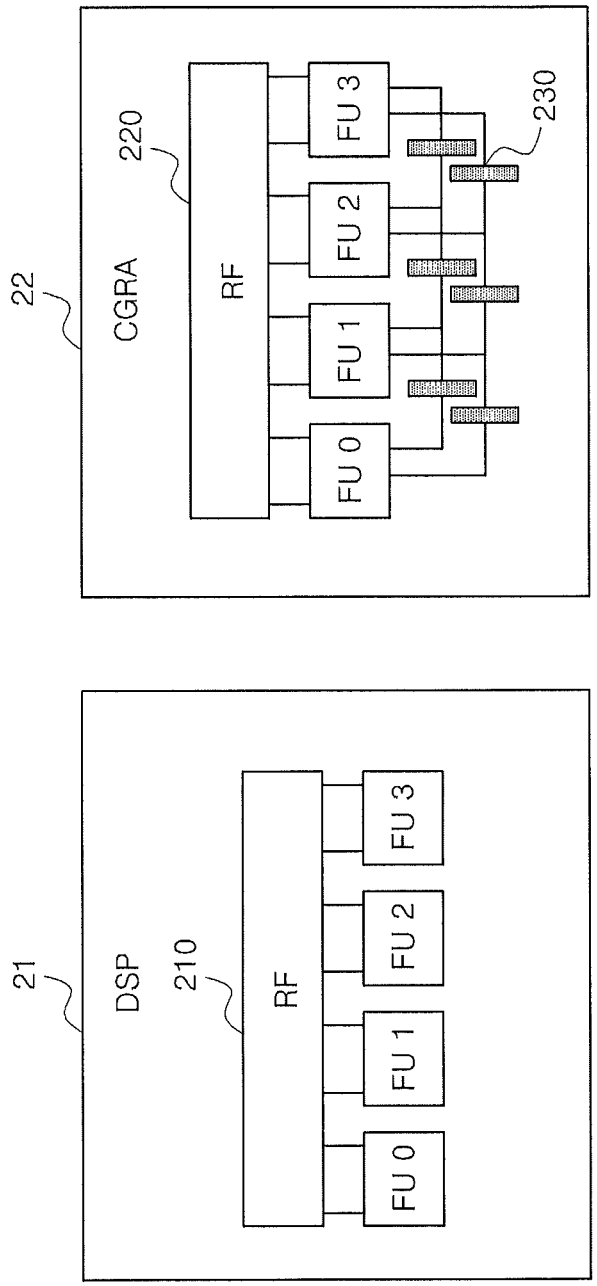
FIG. 2 illustrates a general digital signal processor (DSP) and a general coarse-grained reconfigurable architecture (CGRA)

FIG. 2 illustrates the loop processing in a general digital signal processor (DSP) 21 and a general coarse-grained reconfigurable architecture (CGRA) 22. Referring to FIG. 2, the general DSP 21 is on the left side, and the general CGRA 22 is on the right side.

The general DSP 21 includes four function units FUs, and a register file RF 210. The general CGRA 22 includes four FUs, one register file RF 220, and six pipeline registers 230. The six pipeline registers 230 may also be referred to as flip-flops. The function units FUs may be referred to as processing elements, and may be, but not limited to, arithmetic and logic units (ALUs), comparators, adders, multipliers, shifters, load/store units, or the like.

When the loop is processed in the general DSP 21 according to the modulo scheduling method, instructions that are respectively included in different iterations may be implemented in one cycle. For example, FU 0 that includes the instruction D0, FU 1 that includes the instruction C1, FU 2 that includes the instruction B2, and FU 3 that includes the instruction A3 are implemented in the fourth cycle. In the general DSP 21, when an instruction corresponding to each of the FUs is implemented, results of implementing the instructions are written back on the register file RF 210. Accordingly, when the result of implementing the instruction D0 in the fourth cycle is required in order to implement the instruction C2 in the fifth cycle, the FU 1 reads the result of implementing the instruction D0 in the fourth cycle from the register file RF 210.

Meanwhile, in the sixth cycle, it is assumed that an interrupt or switching of a multi-thread results in a temporary halt in the loop processing. In this regard, a state of the loop processing by the fifth cycle is stored in the register file RF 210. The general DSP 21 records the state of the loop processing by the fifth cycle, which is a context, to a data memory, and processes the interrupt or the switched thread first. When the processing of the interrupt or the switched thread is completed, the general DSP 21 may restore the context from the data memory, and may restart the loop processing. Here, the context means an operation state of a processor, for example, a value such as a result of the loop processing by the fifth cycle stored in a program counter PC and the register file RF 210.

In the general CGRA 22, the pipeline registers 230 increase a depth of pipelining, and are used to accelerate the loop processing.

For example, when there are two instructions A and B, it is assumed that the instruction A may generate a value, and the other instruction B uses the value. In the general DSP 21, when the implementation of the instruction A is completed, the implementation value is written back on the register file RF 210. In the next cycle, the general DSP 21 reads a necessary value from the register file RF 210, and implements the instruction B.

On the other hand, the general CGRA 22 may implement the instruction B not by reading any value from the register file RF 220. For example, the FUs of the general CGRA 22 may forward values necessary to implement the instruction B through wires or the pipeline registers 230 that are directly interconnected with each other. Therefore, the general CGRA 22 may decrease a cycle necessary to read from and write on the register file RF 220.

However, the general CGRA 22 may not store a value on the fly that is temporarily stored in the pipeline registers 230 or is directly forwarded (bypassed) between the FUs to the data memory. For example, it is assumed that the FU 2 outputs b when an output a of the FU 1 is immediately input to the FU2. In this case, since the FU 2 does not output the input a, the input a of the FU 2 may not be stored through the FU 2. Also, the FU 1 outputs a to the FU 2, but does not store the a. Thus, the output a may not be stored through the FU 1. Accordingly, since it is impossible for the general CGRA 22 to store the value on the fly, the general CGRA 22 may not store the context, and needs to start the loop over when the general CGRA 22 stops processing the loop. In the end, the general CGRA 22 according to the related art has no function that supports the temporary halt of the loop processing, and thus the general CGRA 22 may not process an interrupt or multi-thread switching in advance.

FIGS. 3A to 3D are diagrams illustrating modulo scheduling according to one or more embodiments, and a concept of processing a loop according to the modulo scheduling.

Figure 3A:
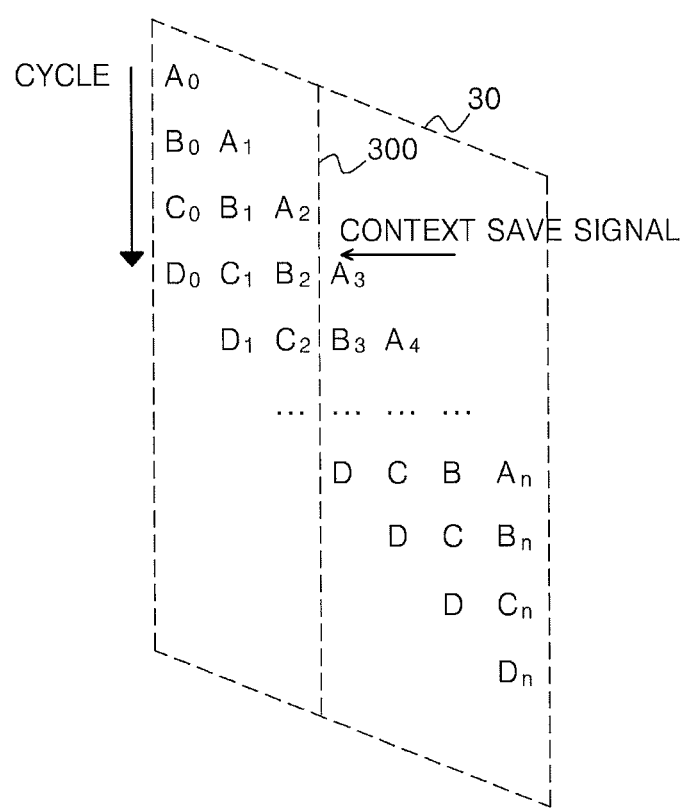
FIGS. 3A to 3D are diagrams illustrating modulo scheduling according to one or more embodiments, and a concept of processing a loop according to the modulo scheduling.
Figure 3B:
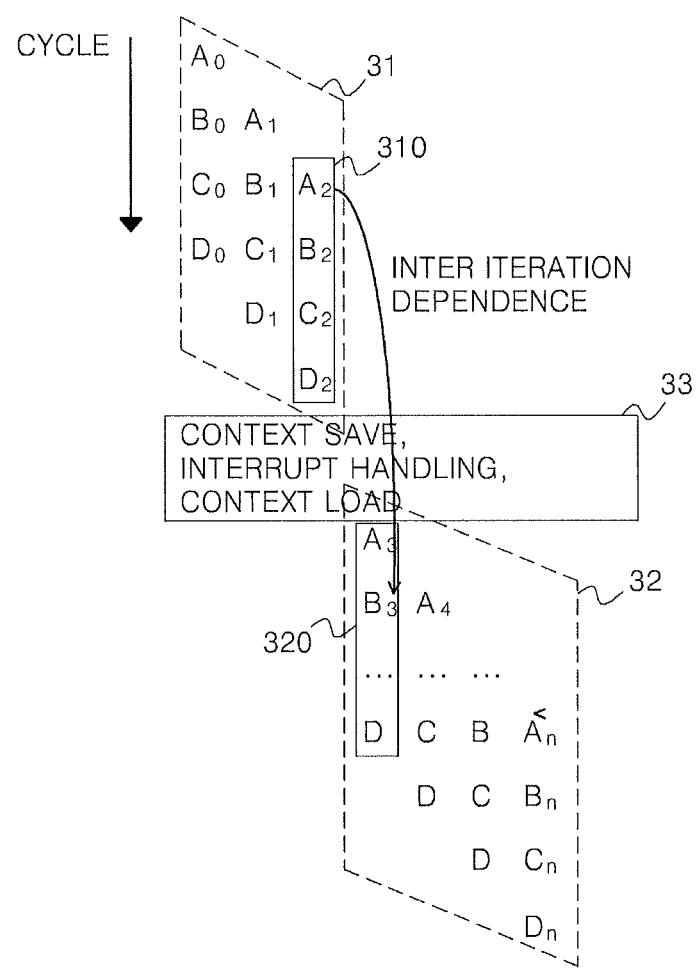

In FIG. 3A, it is assumed that a control signal (hereinafter referred to as 'first control signal') for storing a context along with a start of the fourth cycle is reset (activated). Also, it is assumed that the first control signal is generated according to an interrupt. In this regard, based on the dashed line 300, iterations of the loop 30 may be separated. That is, one loop 30 may be separated into a first loop 31 and a second loop 32, as illustrated in FIG. 3B.

When processing of the first loop 31 is completed, the processing of the loop 30 may temporarily stop. In the cycle after the processing of the loop 30 stops, a context according to the processing of the first loop 31 may be stored, and an interrupt may be processed. When the processing of the interrupt is completed, the stored context may be reloaded. Then, by using the stored context, the second loop 32 may start.

A reason why the context needs to be stored is that there may be an inter-iteration dependence between a third iteration 310 and a fourth iteration 320 of the loop 30. For example, a result of processing the instruction A2 in the third iteration 310 may be an input value of the instruction B3 in the fourth iteration 320. Therefore, data having the inter-iteration dependence needs to be stored in the data memory as a context.

In the general CGRA 22, data that is stored in the pipeline registers 230 or is directly forwarded between the FUs may not be stored as a context, and thus the data having the inter-iteration dependence may be stored in a central register file 940. The data stored in the central register file 940 may be stored in a data memory 91. The central register file 940 is also referred to as a sharing register file. Hereinafter, a first register file or the sharing register file is the same as the central register file 940.

In FIGS. 3A and 3B, the first control signal is set as the fourth cycle starts. However, a point where the processing of the loop 30 temporarily stops, and a context is actually stored may be after the sixth cycle in which the third iteration 310 is completed.

Not every instruction that is scheduled by the sixth cycle is implemented. For example, in a case where the first control signal is not reset, the instructions A3, B3, C3, D3, A4, and B4 that may be implemented by the sixth cycle are not implemented. Although the instructions A3, B3, C3, D3, A4, and B4 that are positioned on a right section from the dashed line 300 may be implemented, the instructions A3, B3, C3, D3, A4, and B4 are values that may not be stored as the context.

The central register file 940 may need to store results of implementing the instructions A3, B3, C3, D3, A4, and B4 in order to store the results of implementing the instructions A3, B3, C3, D3, A4, and B4 as the context. According to this process, however, the acceleration of the loop 30 in the general CGRA 22 may be embodied, as described with reference to FIGS. 3C and 3D.

Figure 3C:
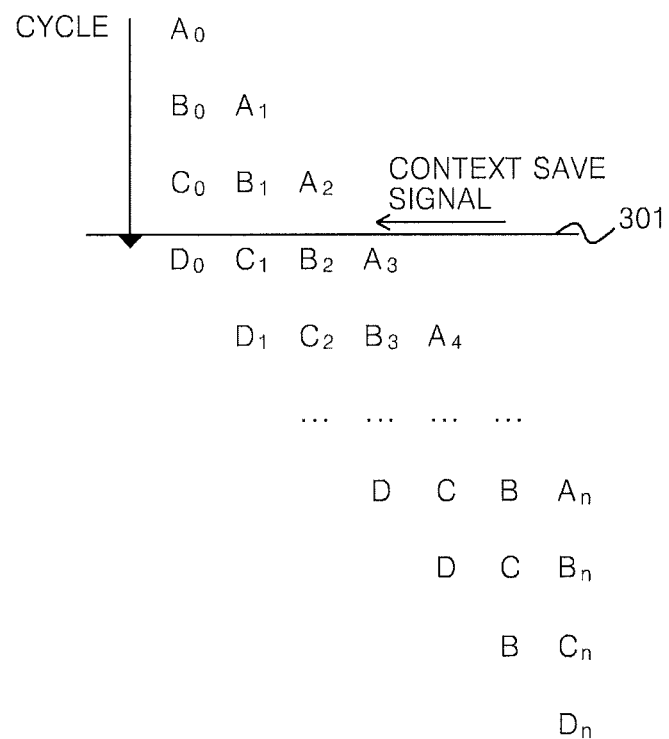
Figure 3D:
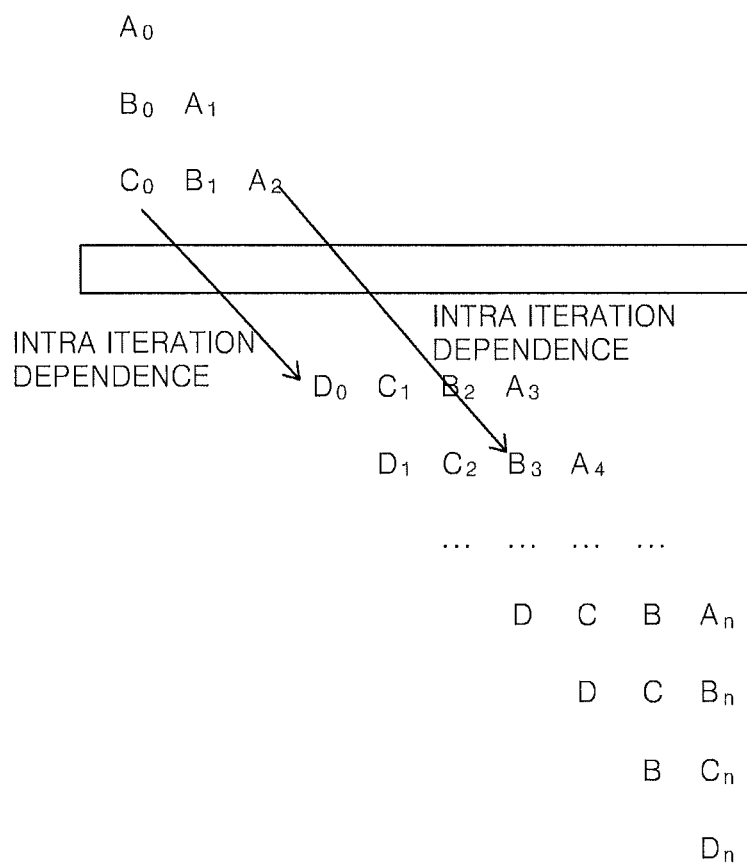

Referring to FIGS. 3C and 3D, when the first control signal immediately stores the reset context as illustrated in FIG. 3C, the loop 30 may need to be separated based on a dashed line 301 and implemented. As illustrated in FIG. 3D, data that relates to the inter-iteration dependence as well as intra-iteration dependence may need to be stored.

In general, a loop may include intra-iteration dependence that may frequently occur, but storing the context as illustrated in FIGS. 3C and 3D may need to be implemented in any cycle. In preparation for storing a context that may not be predicted in advance, results of implementing almost all the instructions may need to be written back on the register files in FIGS. 3C and 3D. In the end, use of the pipeline registers 230 and data forwarding for the loop acceleration in the general CGRA 22 may be prevented, and thus the separation in the implementation of the loop 30 and the storage of the context may not be appropriate for the general CGRA 22, as illustrated in FIGS. 3C and 3D.

Figure 4:
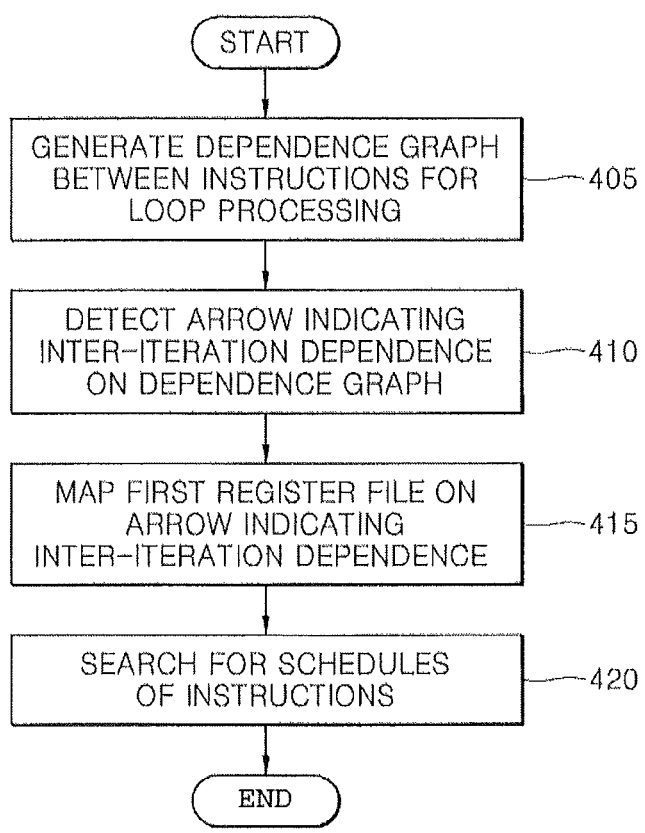
FIG. 4 is a flowchart of a method of modulo scheduling, according to one or more embodiments.

FIG. 4 is a flowchart of a method of modulo scheduling, according to one or more embodiments. The method of FIG. 4 may be implemented by a scheduling apparatus 10. Also, when a reconfigurable processor 90 includes a modulo scheduler 910, the method of FIG. 4 may be implemented by the reconfigurable processor 90. Hereinafter, it is assumed that the method of FIG. 4 is implemented by the scheduling apparatus 10 for convenience of explanation.

The scheduling apparatus 10 may generate a dependence graph between instructions for loop processing, in operation S405. The scheduling apparatus 10 may analyze the dependence between the instructions for the loop processing, and may generate the dependence graph. In general, the instructions of the loop may be dependent on other instructions, and the dependence of the instructions may be classified into inter-iteration dependence and intra-iteration dependence. The dependence may be illustrated as a graph. On the dependence graph, the instructions may be indicated as nodes or vertexes, and each dependence of the instructions may be illustrated as an edge or an arrow having directivity.

Figure 5:
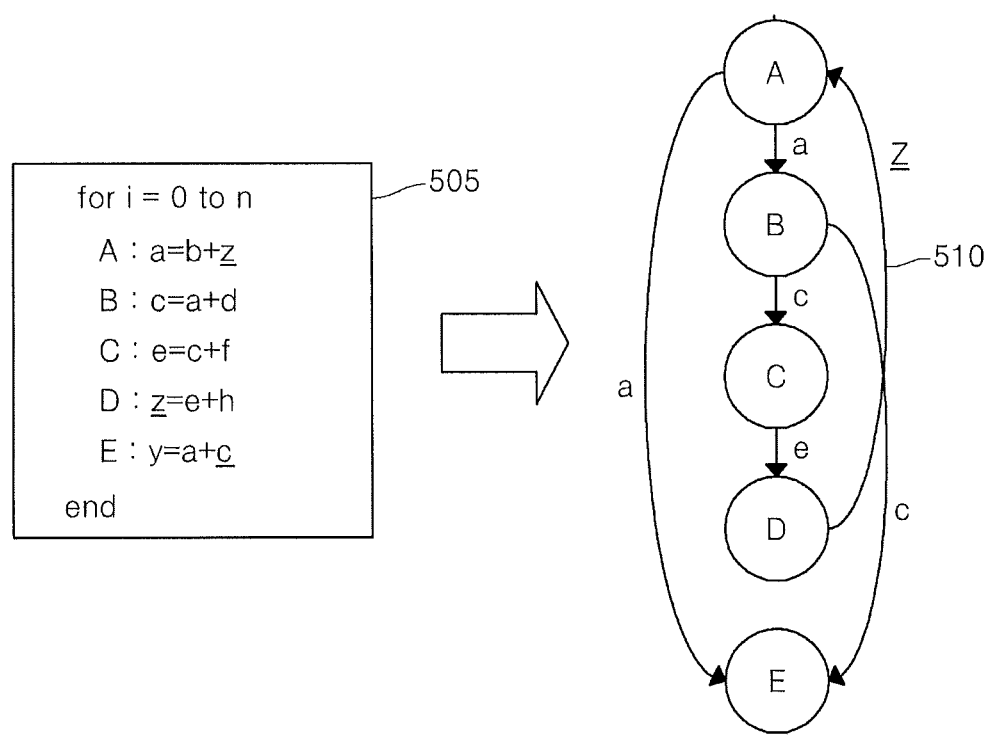
FIG. 5 illustrates a dependence graph according to one or more embodiments.

FIG. 5 illustrates a dependence graph 510 according to one or more embodiments. The dependence graph 510 shows a code 505, as illustrated in FIG. 5. In the dependence graph 510, arrows directing downwards indicate intra-iteration dependence, and arrows directing upwards indicate inter-iteration dependence. For example, in the dependence graph 510, A has an intra-iteration dependence relation with B and E, and has an inter-iteration dependence relation with D. In the code 505, A is implemented by using z calculated by D that is a previous iteration. Therefore, A may be implemented after the previous iteration, D, is implemented.

The scheduling apparatus 10 may detect an arrow indicating the inter-iteration dependence in the dependence graph 510. In FIG. 5, the scheduling apparatus 10 may detect that the instructions D and A are in a dependence relation in the dependence graph 510.

The scheduling apparatus 10 may map the central register file 940 of the reconfigurable processor 90 on the arrows indicating the inter-iteration dependence in the dependence graph 510. Accordingly, the central register file 940 may store data having the inter-iteration dependence. The data having the inter-iteration dependence may indicate data necessary to implement other iterations according to the inter-iteration dependence. For example, when the instruction A that is the $n^{th}$ iteration, and the instruction B that is $n+1^{th}$ iteration are in an inter-iteration dependence relation, output data of the instruction A has the inter-iteration dependence.

The scheduling apparatus 10 may schedule the instructions for the loop processing based on the mapping result in operation S420. Operations S415 and S420 will be described in detail with reference to embodiments illustrated later.

FIG. 7 is a flowchart of a method of modulo scheduling, according to one or more embodiments. The method of FIG. 7 may be implemented by the scheduling apparatus 10 according to one or more embodiments. Also, when the reconfigurable processor 90 includes the modulo scheduler 910, the method of FIG. 7 may also be implemented by the reconfigurable processor 90. Hereinafter, it is assumed that the method of FIG. 7 is implemented by the scheduling apparatus 10 for convenience of explanation. The above descriptions may apply to one or more embodiments.

Figure 6A:
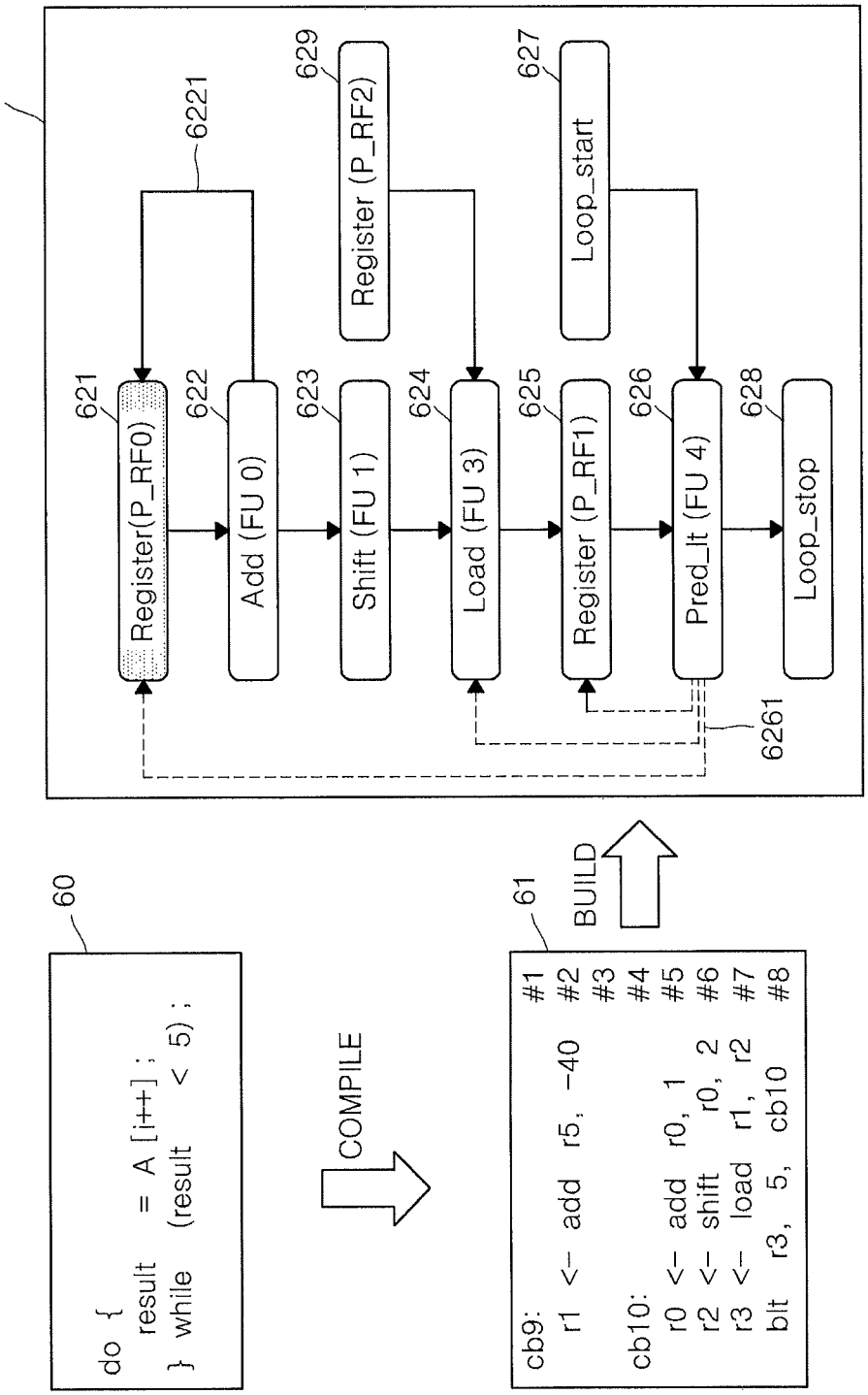
FIGS. 6A through 6C illustrate dependence graphs according to one or more embodiments.

Referring to FIG. 7, the scheduling apparatus 10 may generate a dependence graph between instructions for loop processing. Referring to FIG. 6A, a dependence graph 62 is illustrated. The dependence graph 510 of FIG. 5 is generated from a high-level language before being compiled in order to easily explain a concept of the dependence graph 510. The dependence graph 62 of FIG. 6A is generated from assembly language after being compiled. The dependence graph 62 of FIG. 6A illustrates that each node has a mapped function unit and a mapped register file, but the illustration is for convenience of explanation. In the dependence graph 62, a subject that implements the instruction of the node is not actually indicated, and thus a schedule needs to be found according to a scheduling process that will be further described later. For example, in the actual dependence graph 62, there is no indication that a subject implementing an ADD instruction in a node 622 is the FU 0.

The scheduling apparatus 10 may compile a code 60 in a high-level language, and may convert the compiled code 60 into a code 61 in assembly language. The code 60 in the high-level language is a code that sequentially searches an array A until the array A reaches a value of 5 or more. Briefly, in the code 61 in assembly language, #2 denotes an address of a memory indicating a start of the array A. #5 means 'i++'. #6 means that 'i++' is four times greater than the original 'i++' in order to convert a byte address to a word address. For example, a processor uses the byte address, and a memory uses the word address. #7 means that A[i++] is read from the memory, and is stored in a register r3. #8 is a branch instruction according an end condition of the loop, and means 'branch less than.'

The scheduling apparatus 10 may obtain the dependence graph 62 by analyzing the code 61 in assembly language. According to the related art, the dependence graph 62 is completed. However, according to one or more embodiments, the dependence graph 62 is not completed. In the following embodiment, the dependence graph 62 may be modified as a dependence graph 63 of FIG. 6B. Based on a brief examination of a relation between the dependence graph 62 and the code 61, 1) nodes 621 and 622 correspond to #5, ii) a node 623 to #6, iii) nodes 624, 625, and 629 to #7, and iv) nodes 626 and 628 to #8.

In the node 626, Pred_It means a comparator implemented a blt instruction, and according to a comparison result, True/False is output. In the node 626, when r3>=5 is satisfied, the loop processing is terminated by the node 628. When the loop processing is terminated, dashed lines 6261 are control signals that cancel instructions scheduled to implement other iterations.

In operation S715, the scheduling apparatus 10 may determine whether there is an arrow indicating the inter-iteration dependence in the dependence graph. For example, the scheduling apparatus 10 may detect an arrow 6221 indicating the inter-iteration dependence in the dependence graph 62 of FIG. 6A. In another embodiment, the scheduling apparatus 10 may detect an arrow 6421 indicating the inter-iteration dependence in a dependence graph 64, as shown in FIG. 6C.

When there is an arrow indicating the inter-iteration dependence, the scheduling apparatus 10 may determine whether a node to which the arrow indicating the inter-iteration dependence is directed is an RF-type node or an FU-type node. The RF-type node means an instruction or a node using the central register file 940 or the pipeline register files 230. The FU-type node means an instruction or a node using the function units. For example, an instruction or a node that writes back data on a register file is the RF-type node. An instruction or a node commanding ADD or SHIFT is the FU-type node.

For example, in the dependence graph 62 of FIG. 6A, the node 621 to which the arrow 6221 is directed is an RF-type node. When scheduling is performed according to the related art, the pipeline register RF0 may be allocated to the node 621 as shown in parentheses.

When a node to which an arrow indicating the inter-iteration dependence is an RF-type node, the scheduling apparatus 10 may allocate the central register file 940 to the RF-type node to which the arrow is directed. For example, by comparing the dependence graph 62 of FIG. 6A and the dependence graph 63 of FIG. 6B, the scheduling apparatus 10 may allocate the central register file 940 to the node 621 to which the arrow 6221 of the dependence graph 62 is directed.

Accordingly, when the scheduling apparatus 10 allocates the central register file 940 to the node 621, data having the inter-iteration dependence may be stored in the central register file 940. Therefore, the reconfigurable processor 90 may temporarily stop the loop processing, and may store the context.

Figure 6B:
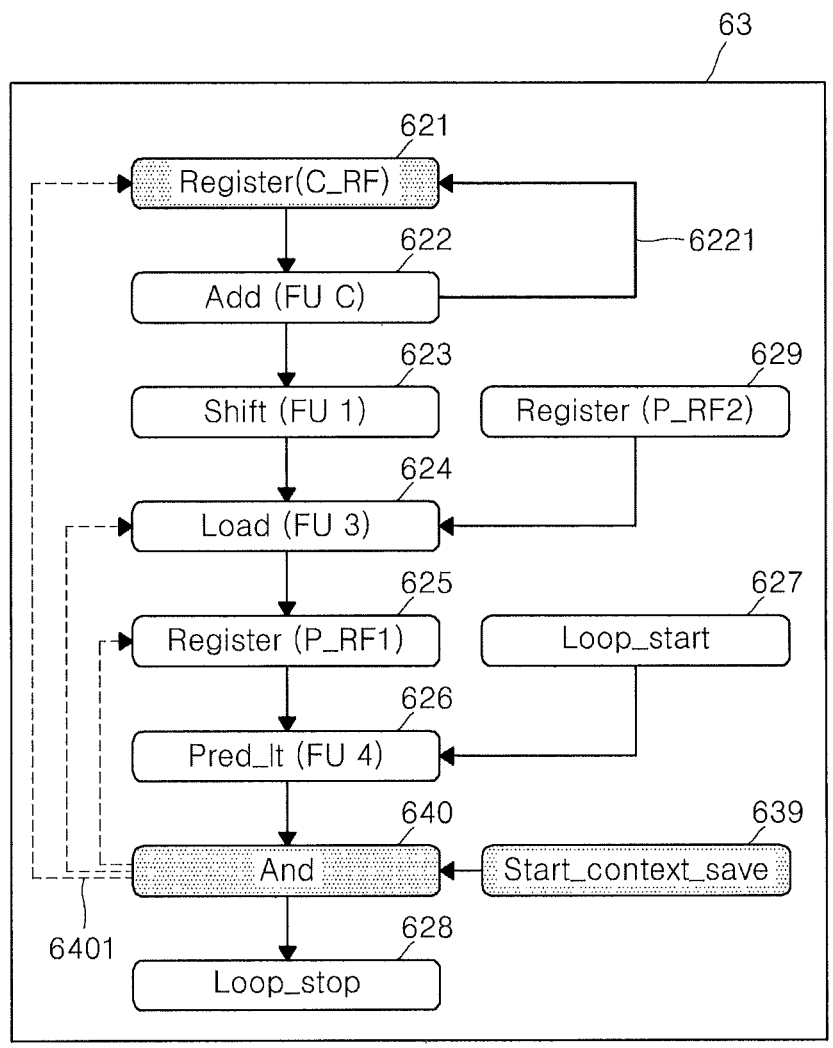
Figure 6C:
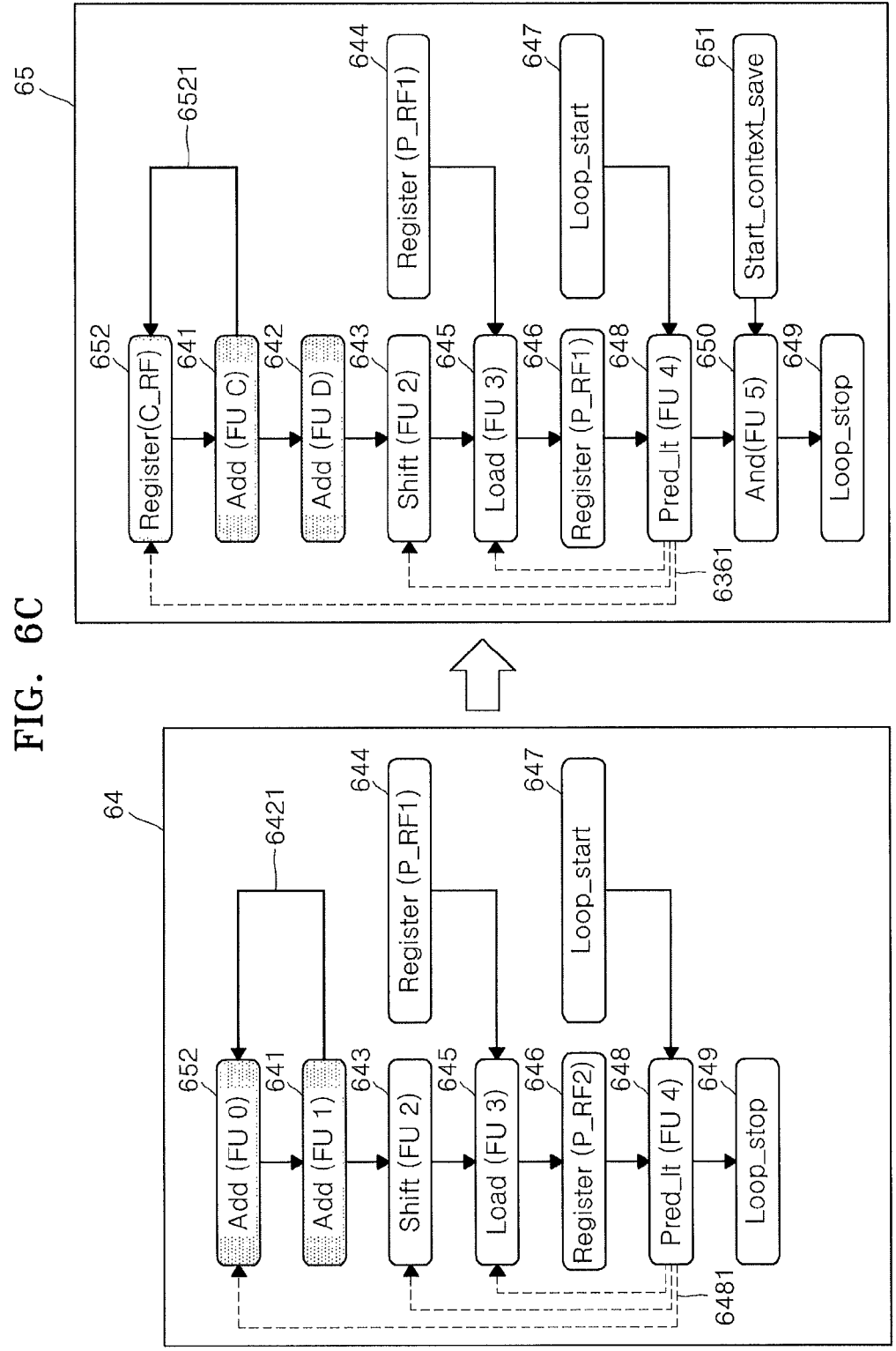

Operation S730 is not a step in which the FUs and RF of the reconfigurable processor 90 are designated as shown in parentheses of the dependence graph 63 illustrated in FIG. 6B. As described above, the parentheses are used to explain a difference between one or more embodiments and the related art when the scheduling apparatus 10 performs the scheduling. Designation of the FUs and the RF as in the parentheses of the dependence graph 63 may be possible after performing operations 740, which is searching for schedules, 745, which is verification of the schedules, and 750, which is selection of a schedule.

The compulsory allocation of the central register file 940 to the node 621 may be implemented in operation S725, which may be before all schedules are searched for and a schedule is selected. Therefore, the compulsory allocation of the central register file 940 in operation S725 may be understood as a constraint condition that needs to be kept in operation S740.

According to one or more embodiments, the scheduling apparatus 10 may map the FU of the node 622 in advance, and may only allocate a FU that may be mapped to the node 622. For example, when there is no way in which the central register file 940 and the FU 0 directly receive/transmit data from/to each other, overhead that makes the FU 0 implement the ADD instruction of the node 622 may occur. That is, when the FU 0 reads data from the central register file 940 via another FU or the pipeline registers 230, the overhead may occur. Therefore, the scheduling apparatus 10 according to one or more embodiments may map any one of the FUs that are directly connected to the central register file 940 on the node 622 in advance, or may limit the FUs, which may be mapped on the node 622, to the FUs that are directly connected to the central register file 940. This process may also be understood as a constraint condition that needs to be kept in operation S740.

According to one or more embodiments, the FU of the node 622 may be designated according to number of cases in operation S740, which searches for the schedules.

In operation S720, when it is determined that the node to which the arrow indicating the inter-iteration dependence is an FU-type node, the scheduling apparatus 10 may add a first node between the arrow and the FU-type node, and may allocate the central register file 940 to the first node in operation S730.

For example, referring to the dependence graph 64 of FIG. 6C, the ADD instruction may be implemented in a node 641 so that the central register file 940 may not be allocated to the node 641. Thus, the central register file 940 may not be allocated to the FU-type node. When the central register file 940 is not mapped on an arrow 6421, data having the inter-iteration dependence that flows according to the arrow 6421 may not be stored in the central register file 940, and thus a context with regard to the loop processing may not be stored.

Accordingly, the scheduling apparatus 10 may add an RF-type first node that may be allocated to the central register file 940 between the arrow 6421 and the node 641. In a dependence graph 65 on the right side, an RF-type first node 652 is added. Then, the scheduling apparatus 10 may allocate the central register file 940 to the first node 652. Through this process, the data having the inter-iteration dependence that flows according to an arrow 6521 may be stored in the central register file 940. The compulsory allocation of the central register file 940 is the same as the above-described process.

Referring back to FIG. 7, the scheduling apparatus 10 may add second and third nodes 651 and 650 to the dependence graph 64, in operation S733. The second node 651 may be a node for resetting the first node. When the first node 652 is reset, the third node 650 may temporarily stop the loop processing. In FIG. 6C, by comparing the dependence graph 64 with the dependence graph 65, the second and third nodes 651 and 650 are added to the dependence graph 65.

A location to which the third node 650 is added is adjacent to a node 648 indicating an end condition of the loop because the loop processing needs to stop when the third node 650 satisfies any end condition of the loop, and resetting the first control signal. That is, the third node 650 may be added to a location to be able to receive an output of the node 648. In other words, the third node 650 may be added between the node 648 indicating the end condition of the loop and a node 649 stopping the loop processing. In addition, the third node 650 may receive an output of the second node 651.

In one or more embodiments, resetting (activating) the first control signal means a case where the node 651 outputs 0. Also, when the end condition of the loop is satisfied, the node 648 may output 0. Therefore, when any one of the second node 651 and the node 648 outputs 0, the third node 650 may correspond to an AND instruction because the third node 650 needs to stop the loop processing. Thus, addition of the third node 650 may be understood as addition of an AND instruction that does not exist in the existing loop.

Also, the FU for implementing the AND instruction may be allocated to the third node 650. When there are multiple FUs for implementing the AND instruction in the third node 650, the allocation of an FU may be determined in operation S740, which is searching for the schedules.

The third node 650 may cancel schedules fixed for instructions corresponding to the nodes 652, 645, and 646 through dashed arrows 6361. The arrows 6361 may prevent implementation of instructions not to implement the instructions positioned on the right side of the dashed line 300 of FIG. 3A.

When resetting (activating) the first control signal and satisfaction of the end condition of the loop is defined as 1, one of ordinary skill in the art may understand that the third node 650 may correspond to an OR instruction.

Figure 15:
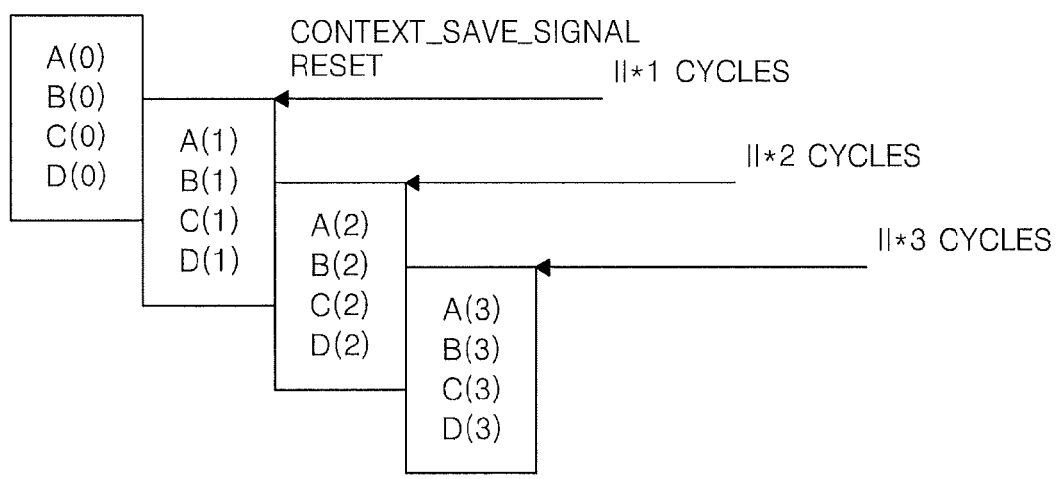
FIG. 15 is a diagram illustrating timing of resetting a control signal, according to another embodiment of the present disclosure.

With regard to the second node 651, it may be good to limit a cycle (a cycle of the reconfigurable processor 90) in which the first control signal may be reset to an integer-multiple cycle of the initiation interval II. For example, referring to FIG. 15, the initiation interval II is 2, and the cycle, in which the first control signal is reset, is limited to an integer multiple of 2 such as 2, 4, 6, 8, etc.

In one or more embodiments, when the initiation interval II is 8, the cycle, in which the first control signal is reset, may be limited to 8, 16, 24, etc. For example, when there is an interrupt in a cycle of 10, the first control signal is not immediately reset. When there is an interrupt in the cycle of 10, the control signal is reset in a cycle of 16.

A reason why the cycle, in which the first control signal is reset, is limited to an integer multiple of the initiation interval II is that a cycle, in which a new iteration of the loop starts, may be an integer multiple of the initiation interval II. That is, a new iteration should not start after a certain cycle in order to separate the loop 30 into the first loop 31 and the second loop 32, as illustrated in FIGS. 3C and 3D. Therefore, by resetting the first control signal to the cycle, in which the new iteration starts, and to a synchronized cycle, the loop 30 may be separated into the first and second loops 31 and 32.

In the dependence graph 63 of FIG. 6B, a second node 639 and a third node 640 are added.

Although it is assumed that there is no arrow indicating the inter-iteration dependence in operation S715 of FIG. 7, the scheduling apparatus 10 may add the second and third nodes 639 and 640 to the dependence graph 63 in operation S733 because the second and third nodes 639 and 640 may be necessary to temporarily stop the loop processing regardless of the existence of the inter-iteration dependence.

The scheduling apparatus 10 may calculate the theoretically minimum initiation interval MII in operation S735. In operation S735, II=max(Rec MII, Res MII) means the calculation of the theoretically minimum initiation interval MII.

The initiation interval MII may be determined as a bigger value from among the Res MII and the Rec MII, wherein the former indicates a minimum initiation interval II calculated by considering the resource constraint, and the latter indicates a minimum initiation interval II calculated by considering the recurrent constraint. The resource constraint is a pipelining constraint according to a hardware structure of a processor for processing a loop, and the recurrent constraint is a pipelining constraint according to the dependence of instructions for processing a loop.

Figure 8:
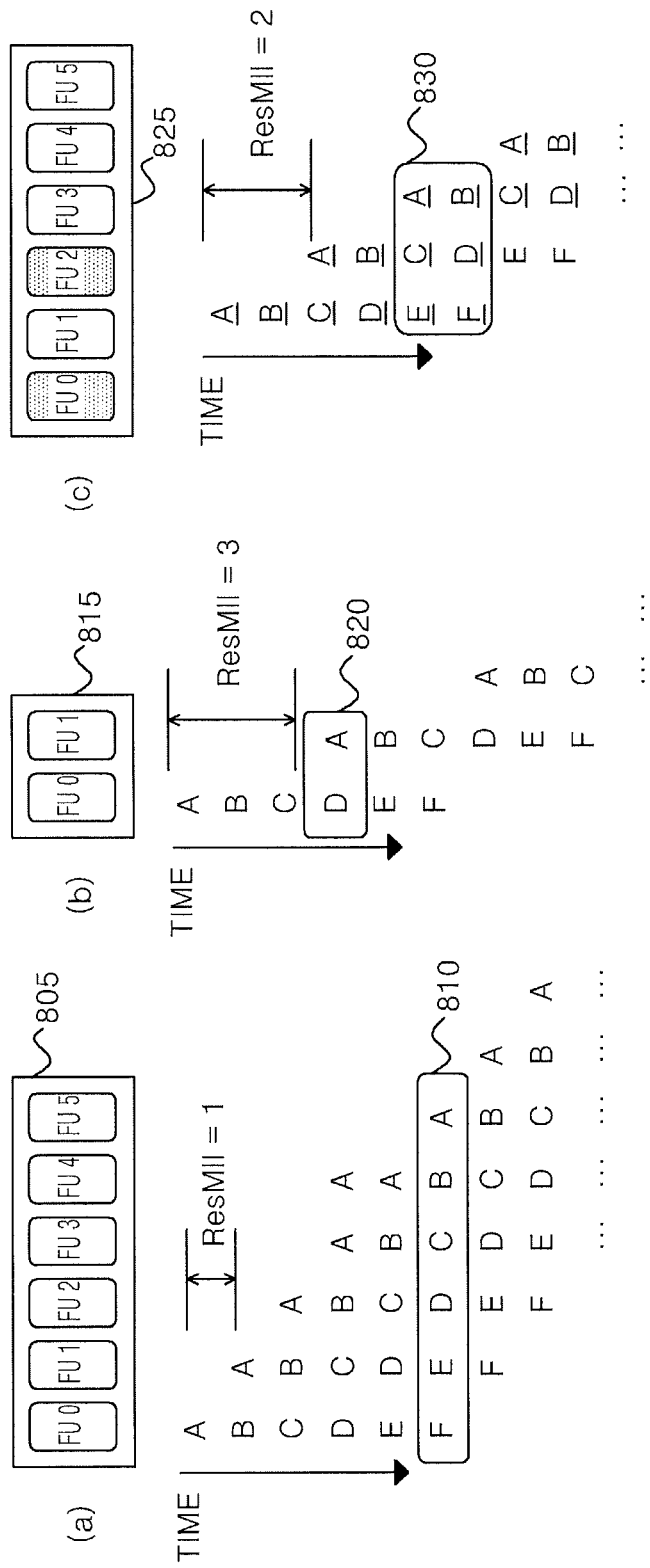
FIG. 8 is a diagram illustrating Res II that is an initiation interval affected by a resource constraint, according to one or more embodiments.

FIG. 8 illustrates example embodiments (a), (b), and (c) describing different hardware structures for calculating the Rec MII. It is assumed that FIG. 8 is scheduled according to the loop as in Table 2. Table 2 includes six instructions. A, B, C, and D are type 1 instructions, and E and F are type 2 instructions. Dependence of the six instructions will not be considered.

TABLE 2

| |
|---|
| for i = 0 to n−1 |
| A(i) ; # Type 1 |
| B(i) ; # Type 1 |
| C(i) ; # Type 1 |
| D(i) ; # Type 1 |
| E(i) ; # Type 2 |
| F(i) ; # Type 2 |
| end |

In the example embodiment (a) of FIG. 8, a processor 805 includes six function units, and it is assumed that all of the function units may implement both type 1 and type 2 instructions. Since the six instructions may be simultaneously implemented by the six function units included in the processor 805, the kernel may be scheduled as in 810. In this case, the Res MII becomes 1.

In the example embodiment (b) of FIG. 8, a processor 815 includes two function units, and it is assumed that all of the function units may implement the type 1 and type 2 instructions. Therefore, only two instructions may be simultaneously implemented, and thus the kernel may be scheduled as in 820. In this case, the Res MII becomes 3.

In the example embodiment (c) of FIG. 8, a processor 825 includes six function units. From among them, it is assumed that the functions units 0 and 2 may only implement the type 1 instructions, and the rest of them may only implement the type 2 instruction. Since two of A, B, C, and D instructions may be simultaneously implemented, the kernel may be scheduled as in 830. In this case, the Res MII becomes 2.

Figure 9:
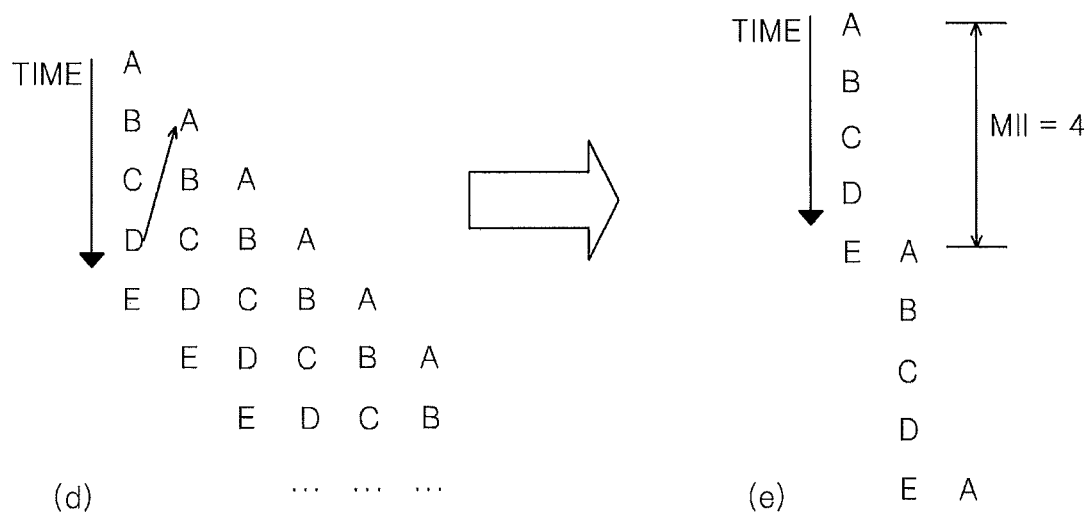
FIG. 9 is a diagram illustrating Rec II that is an initiation interval affected by a recurrent constraint, according to an embodiment of the present disclosure.

FIG. 9 is a diagram illustrating Rec II that is the initiation interval II affected by the recurrent constraint, according to one or more embodiments. In FIG. 9, a schedule will be illustrated for processing the code 505 of FIG. 5. The explanation of the recurrent constraint will be excluded in FIG. 9.

As illustrated by arrows in FIG. 9 (d), the nth iteration, D, and the n+1th iteration, A, are dependent on each other. Therefore, as illustrated in FIG. 9 (e), the instructions may be scheduled, and the Rec MII becomes 4.

The scheduling apparatus 10 may search for schedules of loop instructions regarding the provided initiation interval II (S740 of FIG. 7). The searching of the scheduling apparatus 10 for the schedules may mean that the instructions of the loop are allocated to the function units of a processor, the pipeline registers 230, or the central register file 940 according to time in order for the loop to have the provided initiation interval II.

Since the reconfigurable processor 90 may include various function units and register files, a diverse number of cases may exist with regard to the searching for the schedules about one initiation interval II. According to certain rules, the scheduling apparatus 10 may try organizing the schedules by considering various numbers of cases. In this case, the scheduling apparatus 10 may map the arrow indicating the inter-iteration dependence and the central register file 940, and with consideration for a constraint condition that adjustment is impossible, the schedules may be organized. The schedules may also be organized by considering information on the added second and third nodes 650 and 651.

When searching for the schedules, the schedules may not be found for all cases, or some implementable schedules may be found for some cases. For example, according to a certain number of cases, the organization of the schedules may be impossible in the prologue, and according to another number of cases, the organization of the schedules may be impossible in the kernel.

The reconfigurable processor 90 may implement the instructions of the loop, and may be a processor of the scheduling apparatus 10, or a processor of an external device other than the scheduling apparatus 10. For example, the scheduling apparatus 10 may autonomously process the loop, and may schedule the instructions for the loop processing to be implemented in the processor of the scheduling apparatus 10.

Alternatively, the scheduling apparatus 10 may be a personal computer (PC) that may compile a program code including the loop, and the compiled instructions may be implemented by the reconfigurable processor 90 in a smartphone. For example, a processor of the PC may perform the scheduling, and the scheduled instructions may be implemented in the reconfigurable processor 90 in the smartphone. The PC may search for the schedules by considering a hardware structure and an instruction set architecture (ISA) of the reconfigurable processor 90 in the smartphone so as to implement the instructions in the processor in the smartphone. For example, the following processor information may be considered; the number of function units in a processor, the number and types of register files, a connection relation between the function units, a connection relation between the function units and the register files, or the like.

The scheduling apparatus 10 may generate a modulo reservation table (MRT) with regard to the provided initiation interval II, and thus may search for the schedules. The MRT is a table for detecting a simultaneous demand for resources transmitted by other iterations, and the scheduling apparatus 10 may generate the MRT with regard to the kernel to search for all the schedules. Since the kernel has the deepest depth of the pipelining, it may be possible to organize MRTs of the prologue and the epilogue when the MRT of the kernel is possible. That is, the MRT of the kernel may be used as an MRT for all instructions of the loop.

The MRT arranges the function units and the register files in columns, and cycles in rows. The number of rows may be determined according to that of the initiation interval II of candidates. For example, when the initiation interval II is 4, the scheduling apparatus 10 may form the MRT with 4 rows. As another example, where the provided initiation interval II is 4, and there are six instructions, four function units, and one register file, the MRT may be formed as follows:

TABLE 3

| | FU0 | FU1 | FU2 | FU3 | FU4 |
|---|---|---|---|---|---|
| T = 0 | | Instruction 3(i) | | | Instruction 0 (i + 1) |
| T = 1 | | | Instruction 1 (i + 1) | | Instruction 4 (i + 1) |
| T = 2 | Instruction 5 (i + 1) | | | | |

The scheduling apparatus 10 may determine whether the found schedules are valid in operation S745. Validity of the schedules means that there are implementable schedules with regard to the provided initiation interval II. In a case where the schedules are valid, the MRT may be generated with regard to the provided initiation interval II.

When the searched schedules are valid, the scheduling apparatus 10 may select the searched schedules. When the searched schedules are invalid, the scheduling apparatus 10 may increase the provided initiation interval II at intervals of 1 in operation S755, and may re-search for the schedules in operation S740. In one or more embodiments, the scheduling apparatus 10 may perform a binary search or a parallel search for n schedules regarding the n initiation intervals IIs in order to search for the provided initiation intervals IIs efficiently.

Figure 10:
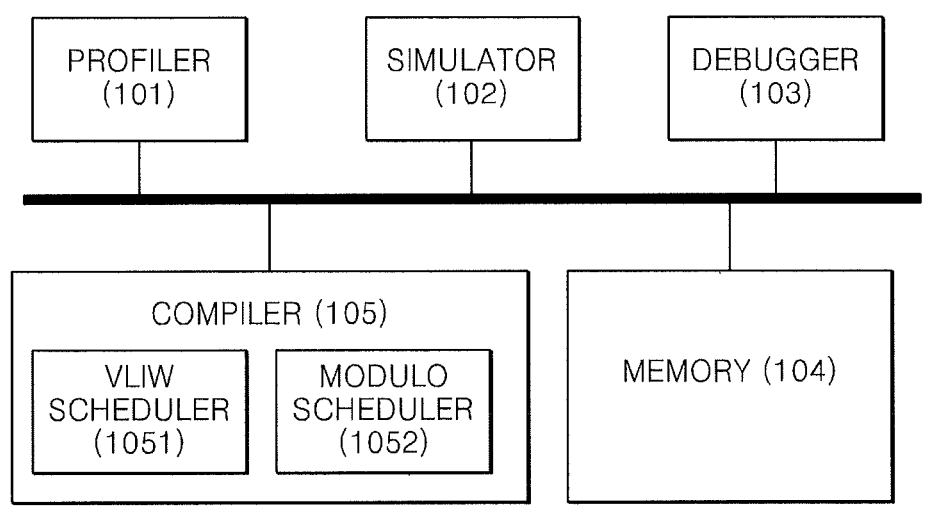
FIG. 10 is a diagram of a scheduling apparatus according to an embodiment of the present disclosure.

FIG. 10 is a diagram of a scheduling apparatus 10 according to one or more embodiments. The scheduling apparatus 10 of FIG. 10 may include a profiler 101, a simulator 102, a debugger 103, a compiler 105, and a memory 104. However, not all components illustrated in FIG. 10 are necessary, and only some of the components may configure the scheduling apparatus 10. Also, the scheduling apparatus 10 may further include other components that are not illustrated herein.

In the scheduling apparatus 10, the profiler 101, the simulator 102, the debugger 103, and the compiler 105 may form a single software development kit (SDK).

The compiler 105 may convert a written program code into a sub-level language. For example, the compiler 105 may convert a program code written in a high-level language into assembly language or machine language. The compiler 105 may schedule instructions of the converted assembly or machine language. The compiler 105 may use information stored in the memory 104 to compile the written program code.

In the memory 104, information on the written program code and on the reconfigurable processor 90 for implementing the program code may be stored. A hardware structure and an ISA of the reconfigurable processor 90 for implementing the program code may also be stored in the memory 104. Information on the hardware structure of the reconfigurable processor 90 may include the number and types of function units, the number of register files (pipeline registers and a central register file), a connection relation between the function units, a connection relation between the function units and the register files, etc. Hereinafter, the register files may include both the pipeline registers and the central register file.

The reconfigurable processor 90 may be a processor of the scheduling apparatus 10, or a processor of another apparatus other than the scheduling apparatus 10.

Also, the instructions compiled by the compiler 105, and a schedule of the instructions generated by the compiler 105 may be stored in the memory 104.

The compiler 105 may erase unnecessary dead code that may not be theoretically implemented in order to reduce a complexity of the written program code. The compiler 105 may convert the program code, in which the dead code is erased, into a sub-level language.

When the reconfigurable processor 90 processes the loop and the instructions that are not the loop with different modules, the compiler 105 may partition the written program code into the loop and a section that is not the loop. For example, when the reconfigurable processor 90 includes a very long instruction word (VLIW) module and a CGRA, the compiler 105 may schedule the section, which is not the loop, to be processed in the VLIW module, and the loop to be processed in the CGRA.

The compiler 105 may include a VLIW scheduler 1051 and a modulo scheduler 1052. The VLIW scheduler 1051 may schedule the section that is not the loop of the program code to be processed in the VLIW module. The VLIW scheduler 1051 may schedule the instructions with regard to the section that is not the loop based on information on hardware of the VLIW module.

The modulo scheduler 1052 may load the instructions for the loop processing from the memory 104. The modulo scheduler 1052 may analyze the instructions for the loop processing, and may schedule operations of the reconfigurable processor 90 for processing the loop. The modulo scheduler 1052 may generate the dependence graph of the instructions. The modulo scheduler 1052 may map the central register file 940 of the reconfigurable processor 90 on the arrow indicating the inter-iteration dependence in the dependence graph. The modulo scheduler 1052 may schedule operations of the reconfigurable processor 90 for processing the loop by using the mapping result and the dependence graph.

The debugger 103 may trace errors in the written program code.

The simulator 102 may provide a hardware environment similar with an external device by virtually configuring hardware resources of the external device in which the written program code may be implemented. For example, when it is assumed that the scheduling apparatus 10 is a PC, and the written program code may be implemented in a smartphone, the simulator 102 may virtually configure the hardware resources of the smartphone through the PC. When the simulator 102 is used, a similar simulation to the one in which the written program code is processed in the smartphone may be implemented.

The profiler 101 may provide profile information with regard to the written program code. The profile information may be changed in various ways according to embodiments, and may include information on a structure of a processor for implementing the program code.

The profile information may be performance information on the program code, and may include statistical data such as information on use of processor resources, information on a time of implementing the program code, and use of the memory 104, and information on the schedules of the instructions. A general performance of the written program code may be determined through the profile information.

Figure 11:
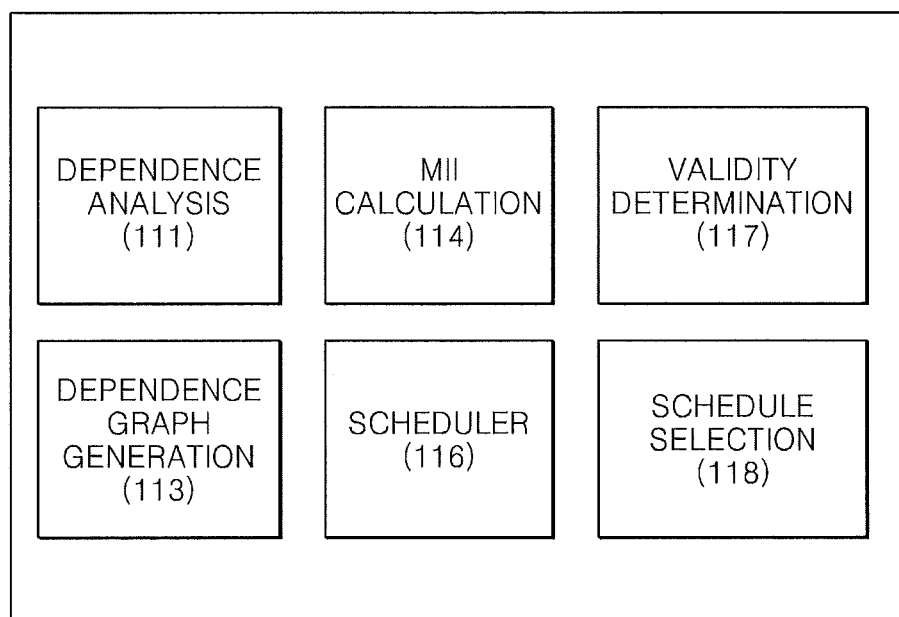
FIG. 11 is a diagram of a modulo scheduler according to an embodiment of the present disclosure.

FIG. 11 is a diagram of a modulo scheduler 11 according to one or more embodiments. The modulo scheduler 11 illustrated in FIG. 11 may be either the modulo scheduler 1052 of the scheduling apparatus 10 illustrated in FIG. 10 or the modulo scheduler 910 of the reconfigurable processor 90 of FIG. 12. In one or more embodiments, the modulo scheduler 11 may be included in other devices than the scheduling apparatus 10 and the reconfigurable processor 90. The modulo scheduler 11 may be embodied as a processor for the modulo scheduling.

Referring to FIG. 11, the modulo scheduler 11 may include a dependence analyzer 111, a dependence graph generator 113, a theoretically minimum initiation interval MII calculator 114, a scheduler 116, a validity determiner 117, and a schedule selector 118. The descriptions that are already provided will be omitted.

The dependence analyzer 111 may analyze the dependence between the instructions for the loop processing.

The dependence graph generator 113 may generate the dependence graph based on a result of analyzing the dependence between the instructions. The dependence graph generator 113 may map the central register file 940 of the reconfigurable processor 90 on the arrow indicating the inter-iteration dependence in the dependence graph.

The dependence graph generator 113 may add the first node between the FU-type node and the arrow indicating the inter-iteration dependence when the arrow indicating the inter-iteration dependence is directed towards the FU-type node. The dependence graph generator 113 may allocate the central register file 940 to the first node.

The dependence graph generator 113 may allocate the central register file 940 to the RF-type node when the arrow indicating the inter-iteration dependence is directed towards the RF-type node.

The dependence graph generator 113 may add the second node for resetting the first control signal while processing the loop, and the third node for temporarily stopping the loop processing according to an input of the first control signal to the dependence graph. The first control signal may be reset at integer-multiple cycles of the initiation interval II between the iterations of the loop.

The MII calculator 114 may calculate the minimum initiation interval, MII. The MII may be determined as a larger value among the Res MII and the Rec MII. The Res MII may indicate a minimum initiation interval MII calculated by considering the resource constraint, and the Rec MII may indicate a minimum initiation interval MII calculated by considering the recurrent constraint. The resource constraint may be a pipelining constraint according to a hardware structure of a processor for processing a loop, and the recurrent constraint may be a pipelining constraint according to the dependence of instructions for processing a loop.

The scheduler 116 may search for the schedules of the instructions of the loop by increasing the initiation interval II until a valid schedule with regard to the provided initiation interval II is found. The validity determiner 117 may determine whether a found schedule is valid. Validity of the schedules means that there are implementable schedules with regard to the provided initiation interval II. When the schedules are valid, the MRT with regard to the provided initiation interval II may be generated. The schedule selector 118 may select the found schedules when the validity of the schedules is determined.

Figure 12:
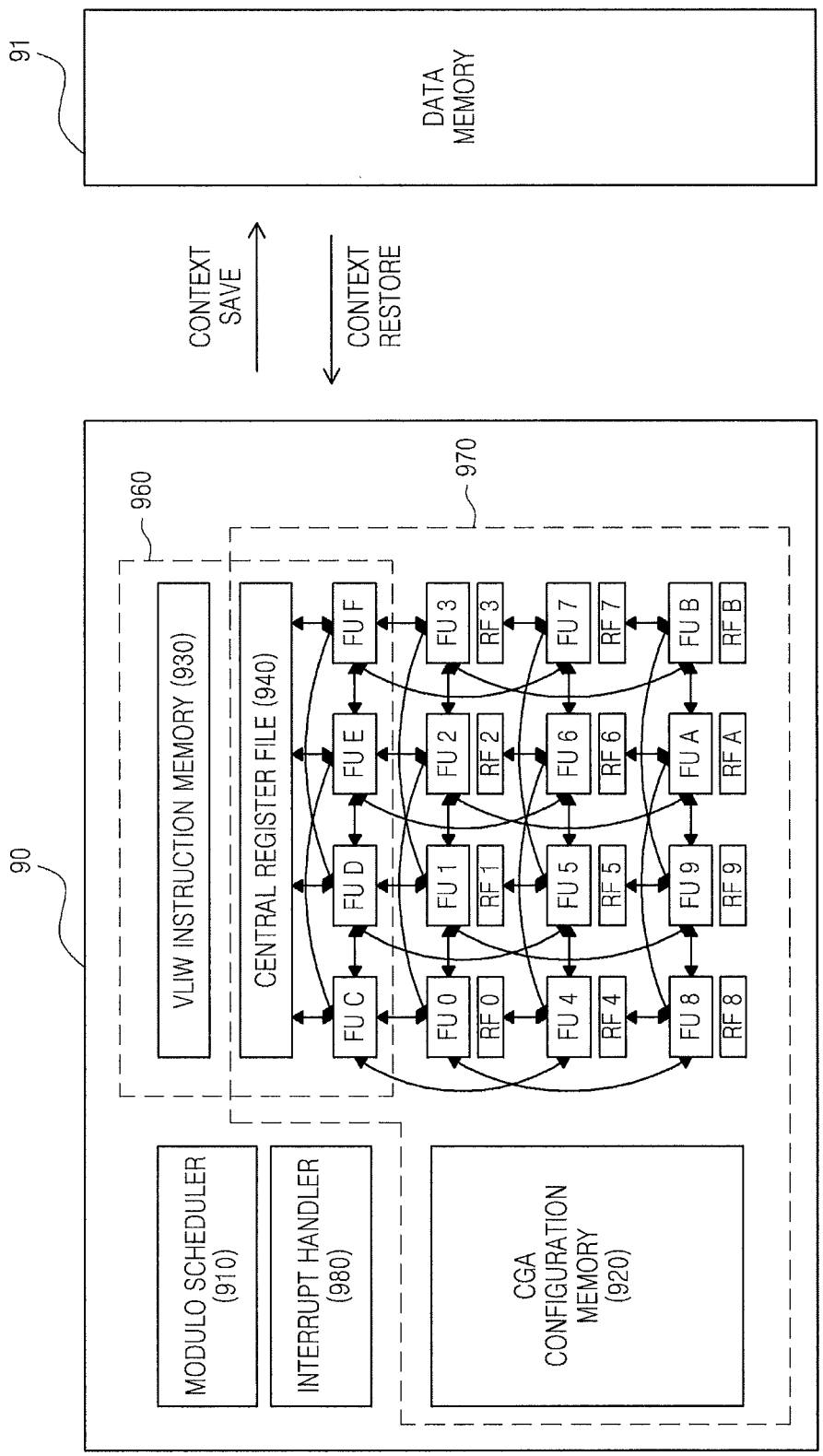
FIG. 12 is a diagram of a reconfigurable processor according to an embodiment of the present disclosure.

FIG. 12 is a diagram of the reconfigurable processor 90 according to one or more embodiments. The descriptions that are already provided will be omitted. In FIG. 12, not all the components are necessary. For example, a dashed section 970 may be embodied as one CGRA. Also, according to embodiments, the modulo scheduler 910 or an interrupt handler 980 may be omitted. A dashed section 960 may be excluded from the reconfigurable processor 90.

Referring to FIG. 12, the reconfigurable processor 90 may include the modulo scheduler 910, a reconfigured memory 920, the central register file 940, a VLIW instruction memory 930, function units, and pipeline registers RFs.

The function units may be classified into first function units FU 0 to FU B that are connected to the pipeline registers RF 0 to RF B and second function units FU C to FU F that are connected to the central register file 940. At least one of the second function units may be a load/store unit. The load/store unit may record data of the central register file 940 in the data memory 91, or data of the data memory 91 in the central register file 940.

In the reconfigurable processor 90, the dashed section 960 may form the VLIW module in order to implement the instructions of the section that is not the loop. The dashed section 970 may form the reconfigurable CGRA 970 for processing the instructions of the loop. However, according to one or more embodiments, the loop may be processed in the VLIW module 960, or the section that is not the loop may be processed in the CGRA 970. The reconfigurable processor 90 may operate in either a CGRA mode or a VLIW mode.

The CGRA 970 may include function units and register files, and may actively form a flow of operations of each of the function units or each of the register files, or a logical connection relation in order to improve the efficiency in the implementation of the instructions.

Each of the register files may store input/output data about each of the function units, or may bypass the input/output data to other function units or register files.

The reconfigurable memory 920 may store hardware information such as types of components, the number of components, and a physical connection state of the components. The reconfigurable memory 920 may store ISA information. The reconfigurable memory 920 may store instructions for the loop processing. The above-described information may be stored in the reconfigurable memory 920 as read-only data. Also, the reconfigurable memory 920 may receive the schedules of the instructions for the loop processing from the modulo scheduler 910, and may store the received schedules. Data having the inter-iteration dependence may be stored in the central register file 940 of the CGRA 970. Therefore, when an interrupt is detected, the data stored in the central register file 940 may be written on the data memory 91.

The VLIW instruction memory 930 of the VLIW module 960 may store the VLIW instructions with regard to the section that is not the loop, and the schedules of the VLIW instructions. The central register file 940 may store the input/output data with regard to the function units included in the VLIW module 960, or the instructions that are fetched from the VLIW instruction memory 930. The data stored in the central register file 940 may be shared by the function units included in the VLIW module 960, and may be written on the data memory (not shown). The reconfigurable processor 90 may further include a VLIW scheduler (not shown) in which the VLIW instructions may be scheduled.

The modulo scheduler 910 may load the instructions for the loop processing from the data memory (not shown) or the reconfigured memory 920. The modulo scheduler 910 may analyze the instructions for the loop processing, and may schedule the operations of the CGRA 970 that may process the loop. One or more embodiments of the modulo scheduler 910 may be understood with reference to the above-mentioned descriptions.

The first and second function units included in the CGRA 970 may implement at least two iterations in the loop by having a cycle gap as much as the initiation interval II. Each of the pipeline registers may be connected to one of the first function units, and may store the input/output data of the first function units. The central register file 940 may be connected to the second function units, and may store the input/output data of the second function units.

The central register file 940 may store the data having the inter-iteration dependence from among the data forwarded from any one of the first function units, the second function units, and the pipeline registers to another.

The interrupt handler 980 may detect an interrupt or a thread conversion during the loop processing. The interrupt handler 980 may reset the first control signal in order to store a context when the current cycle becomes an integer multiple of the initiation interval II.

According to control of the interrupt handler 980, the first and second function units may complete iterations that are being implemented based on the cycle, in which the first control signal is reset, and temporarily stop the loop processing.

The load/store unit that may be connected to the central register file 940 may record all the data stored in the central register file 940 to the data memory when the loop processing temporarily stops. The central register file 940 may record the context of the reconfigurable processor 90 in a previously set address of the data memory 91 through the load/store unit while the loop processing temporarily stops.

An address indicating locations of the loop instructions implemented in the CGRA 970 may also be stored in the data memory 91 in order to restart the loop processing.

When processing of the interrupt or the converted thread is completed, the load/store unit connected to the central register file 940 may restore the context stored in the previously set address of the data memory 91. The context may be restored to the central register file 940.

An address indicating locations of the loop instructions that are implemented may be used in order to restart the loop when the context is restored. In order to restart the implementation of the loop, the instructions such as the instructions of the existing loop may be implemented again.

Figure 13:
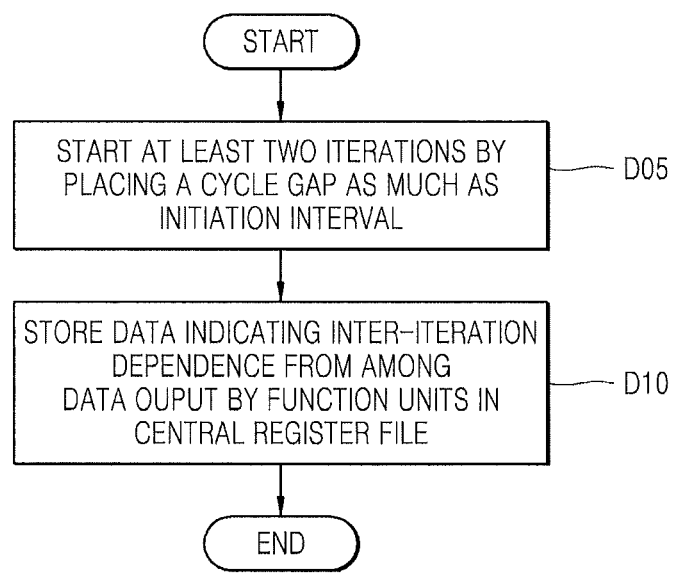
FIG. 13 is a flowchart of a method of processing a loop in the reconfigurable processor, according to an embodiment of the present disclosure.

FIG. 13 is a flowchart of a method of loop processing in the reconfigurable processor 90, according to one or more embodiments. The descriptions that are already provided will be omitted.

The reconfigurable processor 90 may start implementing each iteration of the loop at integer-multiple cycles of the initiation interval II in operation D05.

As the iterations of the loop are implemented, the reconfigurable processor 90 may store the data having the inter-iteration dependence from among the data output by the function units in the central register file 940 in operation D10.

Figure 14:
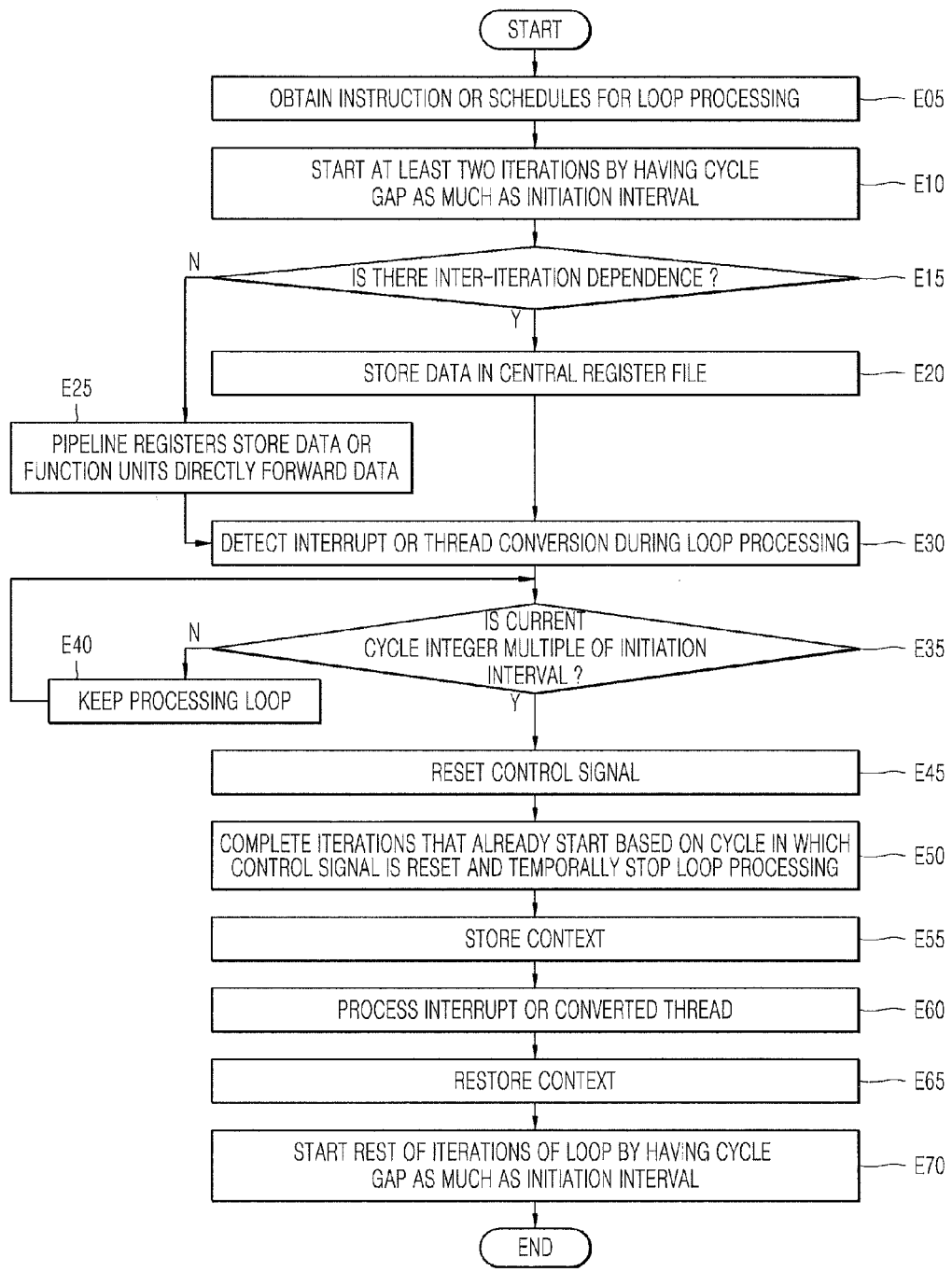
FIG. 14 is a flowchart of a method of processing a loop in a reconfigurable processor, according to another embodiment of the present disclosure.

FIG. 14 is a flowchart of a method of processing a loop in the reconfigurable processor 90, according to one or more embodiments. The descriptions that are already provided will be omitted.

The reconfigurable processor 90 may obtain the instructions and the schedules for the loop processing (operation E05). When the reconfigurable processor 90 does not include the modulo scheduler 910, the schedule may be obtained from the scheduling apparatus 10. The obtained schedules and instructions may be stored in the reconfigurable memory 920.

The reconfigurable processor 90 may implement each iteration of the loop at integer-multiple cycles of the initiation interval II in operation E10.

The reconfigurable processor 90 may determine whether data output by the function units of the processor has the inter-iteration dependence as the iterations of the loop are implemented (operation E15). According to one or more embodiments, operation E15 may be omitted.

The reconfigurable processor 90 may store the data having the inter-iteration dependence in the central register file 940 in operation E20. The data having the inter-iteration dependence may be stored in the central register file 940.

The pipeline registers of the reconfigurable processor 90 may store data having no inter-iteration dependence, or may transmit the data having no inter-iteration dependence to the function units, and the function units may forward the data having no inter-iteration dependence to other function units in operation E25. According to one or more embodiments, the central register file 940 may store the data having no inter-iteration dependence.

The reconfigurable processor 90 may detect an interrupt of a thread conversion while the loop is being processed in operation E30.

The reconfigurable processor 90 may determine whether the current cycle is an integer multiple of the initiation interval II in operation E35. The reconfigurable processor 90 may continue processing the loop when the current cycle is not an integer multiple of the initiation interval II in operation E40. Also, the reconfigurable processor 90 may store the control signal when the current cycle is not an integer multiple of the initiation interval II, and may output the stored control signal when the current cycle is an integer multiple of the initiation interval II.

The reconfigurable processor 90 may reset the first control signal when the current cycle becomes an integer multiple of the initiation interval II in operation E45.

The reconfigurable processor 90 may complete the iterations that already start based on the cycle, in which the control signal is reset, and then may temporarily stop the loop processing, in operation E50. For example, the reconfigurable processor 90 may separate the iterations of the loop in the first loop and the second loop.

The reconfigurable processor 90 may store its context in the data memory 91 in operation E55. For example, the reconfigurable processor 90 may record the data stored in the central register file 940 to the data memory 91 through the load/store unit. When the last iteration of the first loop is completed in the separate loop, the reconfigurable processor 90 may store, in the data memory 91, a result of processing from a first iteration to the last iteration of the first loop. The reconfigurable processor 90 may also store a counter indicating the locations of the loop instructions that are implemented in the data memory 91. The reconfigurable processor 90 may store the context in the previously set address of the data memory 91.

The reconfigurable processor 90 may process the interrupt of the converted thread in operation E60. The reconfigurable processor 90 may maintain a state of resetting the first control signal until the processing of the interrupt or the converted thread is completed.

The reconfigurable processor 90 may restore the context in operation E65. The reconfigurable processor 90 may restore the context from the previously set address of the data memory 91. The reconfigurable processor 90 may load the context to the central register file 940.

The reconfigurable processor 90 may start the rest of the iterations of the loop by placing a cycle gap as much as the initiation interval II in operation E70. For example, the reconfigurable processor 90 may start processing the second loop in the separate loop by using the result of processing the restored first loop.

The scheduling apparatus 10, the modulo scheduler 11, or the reconfigurable processor 90 described above may be embodied as various types of processors, chips, or systems. For example, the scheduling apparatus 10, the modulo scheduler 11, or the reconfigurable processor 90 may be embodied as processors such as, for example, a reconfigurable processor (RP), a coarse grained array (CGA), a fine grained array (FGA), a digital signal processor (DSP), an application-specific instruction-set processor (ASIP), a central processing unit (CPU), and a graphic processing unit (GPU). Also, the scheduling apparatus 10, the modulo scheduler 11, or the reconfigurable processor 90 may be embodied as, for example, a discrete chip or a system on a chip (SoC) including a processor. In addition, the scheduling apparatus 10, the modulo scheduler 11, or the reconfigurable processor 90 may be embodied as, or may be included in devices or systems including the processor, for example, a PC, a server computer, a smartphone, a personal digital assistant (PDA), a portable multimedia player (PMP), a navigation device, a TV, a content playing apparatus, a communication system, an image processing system, a graphics processing system, a laptop, a tablet PC, or the like.

As described above, according to a scheduling method or a loop processing method of a reconfigurable processor according to one or more embodiments, when an interrupt or a thread switching is detected in the reconfigurable processor, a loop that is being processed may temporarily stop, and also a context of the reconfigurable processor may be stored. Therefore, after the interrupt or the switched thread is processed, the context may be restored, and the loop after the temporary stop may be processed again.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to one or more embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method for scheduling processing of a loop in a reconfigurable processor, the method comprising:
    generating a dependence graph of instructions for the processing of the loop;
    detecting an arrow of the dependence graph indicating inter-iteration dependence on the dependence graph;
    mapping a register file of the reconfigurable processor on the detected arrow of the dependence graph indicating the inter-iteration dependence on the dependence graph; and
    searching for schedules of the instructions for the processing of the loop based on the mapping.

2. The method of claim 1, wherein the register file is a central register file connected to at least one load/store unit of the reconfigurable processor implementing a memory access instruction.

3. The method of claim 1, wherein the mapping of the register file comprises:
    adding a node between a function-unit-type (FU-type) node when the arrow is directed towards the FU-type node; and
    allocating the register file to the node.

4. The method of claim 1, wherein the mapping of the register file comprises allocating the register file to a register-file-type (RF-type) node when the arrow is directed towards the RF-type node.

5. The method of claim 1, further comprising adding a node onto the dependence graph, wherein the node resets a control signal for storing a context of the reconfigurable processor in a predetermined cycle.

6. The method of claim 5, wherein the predetermined cycle is an integer-multiple cycle of an initiation interval between iterations of the loop.

7. The method of claim 5, further comprising adding another node onto the dependence graph, wherein the another node temporarily stops the processing of the loop when the control signal is reset or an end condition of the loop is satisfied.

8. A non-transitory computer-readable recording medium having recorded thereon a computer program for executing the method of claim 1.

9. A scheduling apparatus comprising:

a memory that stores instructions for processing of a loop; and a modulo scheduler that generates a dependence graph of the instructions for the processing of the loop and schedules operations of a reconfigurable processor that processes the loop, wherein the modulo scheduler detects an arrow of the dependence graph indicating inter-iteration dependence on the dependence graph, maps a register file of the reconfigurable processor on the detected arrow of the dependence graph indicating the inter-iteration dependence on the dependence graph, and searches for schedules of the instructions for the processing of the loop based on the mapping.

10. The scheduling apparatus of claim 9, wherein the modulo scheduler adds a node between a function-unit-type (FU-type) node when the arrow is directed towards the FU-type node in order to allocate the register file to the node, and allocates the register file to a register-file-type (RF-type) node when the arrow is directed towards the RF-type node.

11. The scheduling apparatus of claim 9, wherein the modulo scheduler adds a node onto the dependence graph that resets a control signal to store a context while processing the loop, and adds another node onto the dependence graph that temporarily stops the processing of the loop according to an input of the control signal.

* * * * *